United States Patent
Murali et al.

(10) Patent No.: US 9,130,683 B2
(45) Date of Patent: Sep. 8, 2015

(54) SILENCE BASED ATTENUATION FOR ENHANCED IDLE-CHANNEL FM OR OTHER RECEIVER CO-EXISTENCE WITH A COEXISTING RADIO AND CIRCUITS, PROCESSES, AND SYSTEMS

(75) Inventors: Sriram Murali, Bangalore (IN); Aravind Ganesan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 850 days.

(21) Appl. No.: 13/171,589

(22) Filed: Jun. 29, 2011

(65) Prior Publication Data

US 2012/0230495 A1 Sep. 13, 2012

(30) Foreign Application Priority Data

Mar. 7, 2011 (IN) .............................. 682/CHE/2011

(51) Int. Cl.
| | |
|---|---|
| H03G 3/00 | (2006.01) |
| H04H 40/72 | (2008.01) |
| H04R 5/00 | (2006.01) |
| H04B 1/10 | (2006.01) |
| H04H 40/45 | (2008.01) |

(52) U.S. Cl.
CPC .................. *H04H 40/45* (2013.01); *H04B 1/10* (2013.01); *Y10T 29/49117* (2015.01)

(58) Field of Classification Search
CPC ....... H04H 20/47; H04H 20/88; H04H 40/45; H04H 40/72; H04B 1/1669; H04B 1/10; H04B 1/1018; H04B 1/16

USPC .................. 381/104, 107, 13, 3, 1, 22, 23, 12; 455/212, 213, 219, 222
See application file for complete search history.

(56) References Cited

U.S. PATENT DOCUMENTS

| | | | |
|---|---|---|---|
| 5,369,711 A * | 11/1994 | Williamson, III | ............ 381/104 |
| 7,787,630 B2 | 8/2010 | Lerner et al. | |
| 2007/0206706 A1 | 9/2007 | Saito et al. | |
| 2007/0294496 A1 | 12/2007 | Goss et al. | |
| 2009/0232316 A1 | 9/2009 | Chen | |
| 2009/0247099 A1 | 10/2009 | Jaisimha et al. | |
| 2010/0189270 A1* | 7/2010 | Noguchi | ......................... 381/56 |
| 2010/0208918 A1* | 8/2010 | Noguchi | ....................... 381/107 |
| 2011/0105037 A1 | 5/2011 | Narasimha et al. | |
| 2011/0222704 A1 | 9/2011 | Blaszczynski et al. | |
| 2011/0275339 A1 | 11/2011 | Allen et al. | |
| 2011/0306313 A1 | 12/2011 | Jaisimha et al. | |
| 2012/0033764 A1 | 2/2012 | Ban | |

\* cited by examiner

*Primary Examiner* — Vivian Chin
*Assistant Examiner* — Douglas Suthers
(74) *Attorney, Agent, or Firm* — John R. Pessetto; Charles A. Brill; Frank D. Cimino

(57) ABSTRACT

An electronic circuit (100) for use in a wireless receiver (1720). The circuit (100) includes an audio demodulator (15), an audio envelope portion (35) operable to deliver an audio envelope signal, a high pass filter (38) coupled between the audio demodulator (15) and the audio envelope portion (35), a volume control (25) fed by the audio demodulator (15) and operable to provide a controllable audio signal output, and a controller (45) responsive to the audio envelope portion (35) to provide an attenuation control to the volume control (25). Other circuits, receivers, processes of operation, processes of manufacture, and processes of testing are disclosed.

27 Claims, 11 Drawing Sheets

FIG. 6

SILENCE BASED ATTENUATION FOR ENHANCED IDLE-CHANNEL FM OR OTHER RECEIVER CO-EXISTENCE WITH A COEXISTING RADIO AND CIRCUITS, PROCESSES, AND SYSTEMS

CROSS-REFERENCES TO RELATED APPLICATIONS

This application is related to India Patent Application 682/CHE/2010 "Silence Based Attenuation for Enhanced Idle-Channel FM Co-Existence with BT/WLAN, etc., with Circuits, Processes, and Systems" (TI-69708IndiaPS) filed Mar. 7, 2010, for which priority is claimed under the Paris Convention and 35 U.S.C. 119 and all other applicable law, and which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND

This invention pertains to FM (frequency modulation) receivers and other wireless receivers such as in combined radios. FM, for example, is popular in many developed countries and is growing in popularity in a number of developing countries.

In the United States and Europe, FM broadcast stations use a bandwidth of 200 KHz assigned to them at different frequencies or positions within the 87.5 MHz to 108 MHz frequency band. In Japan the FM band or available frequency spectrum is a 76 MHz to 90 MHz band, and an FM channel can be centered at multiples of 50 KHz, with a frequency spacing of at least 200 KHz between any two valid stations.

With the growing popularity of FM transmission in a number of developing countries, as well as the developed countries, low-cost integrated FM receivers have become important to integrate into mobile handsets like cell phones and Internet devices.

Bluetooth and/or WLAN (wireless local area network) activity can cause problematic audible artifacts during FM reception in some combo system on a chip units (SoCs) with FM, under a so-called "idle channel" condition. Suppose the FM carrier is kept unmodulated. Hence, silence is expected on demodulation. During BT/WLAN activity, two kinds of audible artifacts may show up: 1) audible "clicks" during start/stop of BT/WLAN activity, and 2) an audible "hum" at a frequency dependent on the BT/WLAN packet activity profile. Eliminating such artifacts is a desirable and important goal since audibility of spurious artifacts affects the user experience. Moreover, such audibility provides an important coexistence metric for FM performance testing that is readily measured.

One approach might reduce the audibility of the hum by improved de-coupling between the FM core and the aggressor cores or offending cores. However, such de-coupling likely would impose an increase in chip area. Another approach might add an inductor to an FM synthesizer power supply to improve co-existence performance. However, such inductor increases the number of parts in the system, such as on a printed circuit board, and likely imposes an additional cost.

Due to expected high adoption of low-cost integrated FM receivers in mobile handsets, inventive ways of delivering enhanced idle-channel coexistence and eliminating most or all such audible artifacts at low cost would be most desirable in this technology area.

SUMMARY OF THE INVENTION

Generally, one form of the invention involves an electronic circuit for use in a wireless receiver. The circuit includes an audio demodulator, an audio envelope portion operable to deliver an audio envelope signal, a high pass filter coupled between the audio demodulator and the audio envelope portion, a volume control fed by the audio demodulator and operable to provide a controllable audio signal output, and a controller responsive to the audio envelope portion to provide an attenuation control to the volume control.

Generally, another form of the invention involves an electronic circuit for use in an FM receiver, the circuit including an electronic processor of demodulated FM stereo, and an electronic instruction storage coupled with the electronic processor so that the electronic processor is operable substantially in accordance with the instructions therein, and at least a portion of the storage representing monaural and stereo audio processing and stereo volume control, a high pass filter of the stereo and audio envelope generation preceded by the high pass filtering, and selective attenuation control for the volume control responsive to the audio envelope generation.

Generally, an electronic process of operation form of the invention is for use in a wireless receiver. The process includes demodulating to provide audio, generating an audio envelope from the audio, and selectively attenuating the audio based on substantial silence in the audio envelope that is resistant to low frequency glitches, the glitch-resistance achieved by high-pass filtering prior to the audio envelope generation.

Generally, a further form of the invention involves a mobile device having an FM receiver and a least one coexisting radio operable to indirectly introduce low-frequency audio glitches in the FM receiver, the FM receiver including an FM demodulator, a stereo decoder, and an audio section fed therefrom, and a parallel silence-detection-based attenuation control section for the audio section responsive to the stereo decoder and having an anti-glitch section whereby the attenuation control is made resistant to the audio glitches.

Generally, and in still another form of the invention, a stereo audio circuit includes a stereo decoder supplying left and right channel audio outputs, a volume control section for the right and left channel audio outputs that is also adjustable by an attenuation control, an audio envelope detector operable to provide an audio envelope output approximately representing an averaged sum of magnitudes of the right and left channel audio outputs, and a silence detector responsive to the output from the audio envelope detector and operable to provide the attenuation control.

Generally, and in a yet further form of the invention, a wireless integrated circuit includes a front end module including a synthesizer loop, a baseband module with a signal path and fed by the front end module; and at least one co-existing wireless source, the signal path of the baseband module subject to possible interference from the coexisting wireless source by way of synthesizer loop corrections in the front end module, the baseband module including a demodulator, and a demodulated signal path and a high pass filter both coupled to the demodulator, and a demodulated-signal detector including envelope detection fed by the high pass filter and operable to selectively introduce attenuation into the demodulated signal path depending on presence or absence of demodulated signal, whereby reducing interference effects from the co-existing wireless source.

Generally, a manufacturing process form of the invention includes providing a system-on-a-chip including a receiver and a co-existing radio, the receiver including a demodulator, a demodulated signal path and a high pass filter both coupled to the demodulator, and a signal-absence detector including envelope detection fed by the high pass filter and operable to introduce attenuation into the demodulated signal path; disabling the high pass filter to pass more frequencies; activating the co-existing radio and detecting an interference effect to the receiver; enabling the high pass filter to reject at least some low frequencies; and electronically verifying that the signal-absence detector introduces attenuation whereby to resist the interference effect, and passing or rejecting the system-on-a-chip depending at least in part on the resistance to the interference effect.

Generally, a testing process form of the invention includes modulating an FM signal with a variable amplitude single tone, whereby the variable amplitude varies the frequency deviation, applying the FM signal as a test input to an FM receiver having a silence-based audio attenuation, monitoring for non-linearity in the demodulated audio amplitude relative to the variation in the amplitude of the single tone modulation, whereby to test the silence-based audio attenuation, and varying the audio frequency of the single tone and monitoring for variation of the non-linearity itself, whereby to test glitch-resistance of the silence-based audio attenuation.

Other circuits, integrated circuits, devices, receivers and systems, and processes of operation, processes of manufacturing, and processes of testing are also disclosed and claimed.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Some of the embodiments are applied in audio signal demodulator circuitry and enhance user perception by silence detection followed by audio attenuation, and further introducing and incorporating immunity to disturbance in audio envelope detection. Silence periods are monitored by audio envelope measurement while being immune or resistant to "slow" frequency drifts of a type and rate associated with interference by coexisting radios. The silence assessment remarkably employs envelope-based silence detection-based audio attenuation to enhance audio perception under co-existence scenarios. In this way, the envelope detection is performed with immunity or resistance to low-frequency disturbances.

Figure 1:
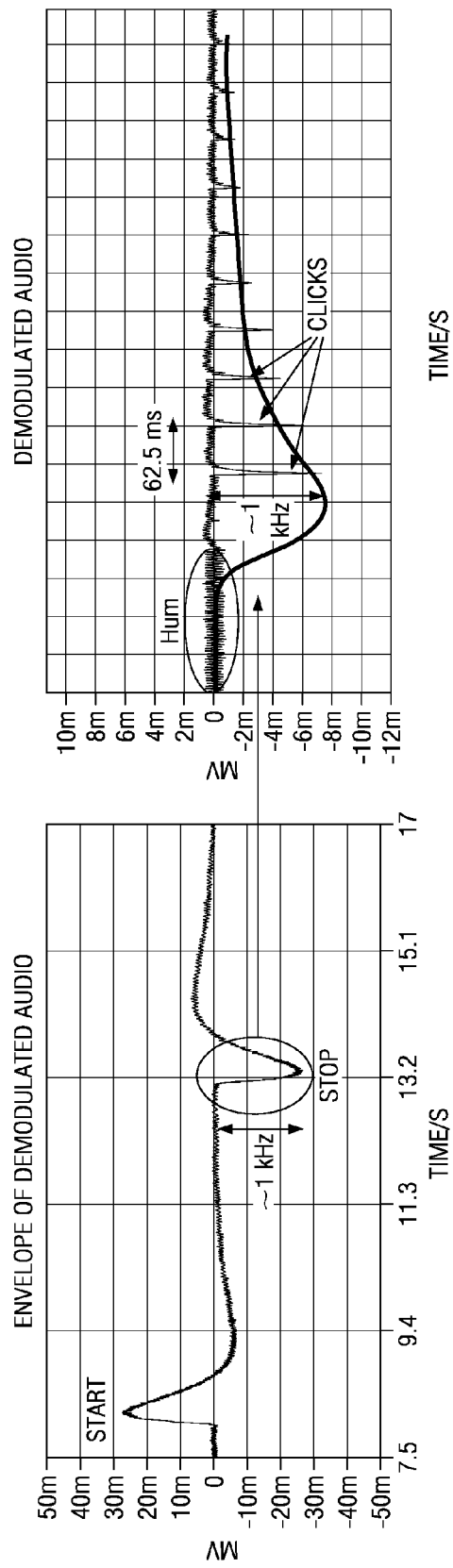
FIG. 1 is a voltage-versus-time graph of an envelope of FM demodulated audio, including a detail of clicks arising from coexistence interference.
Figure 10:
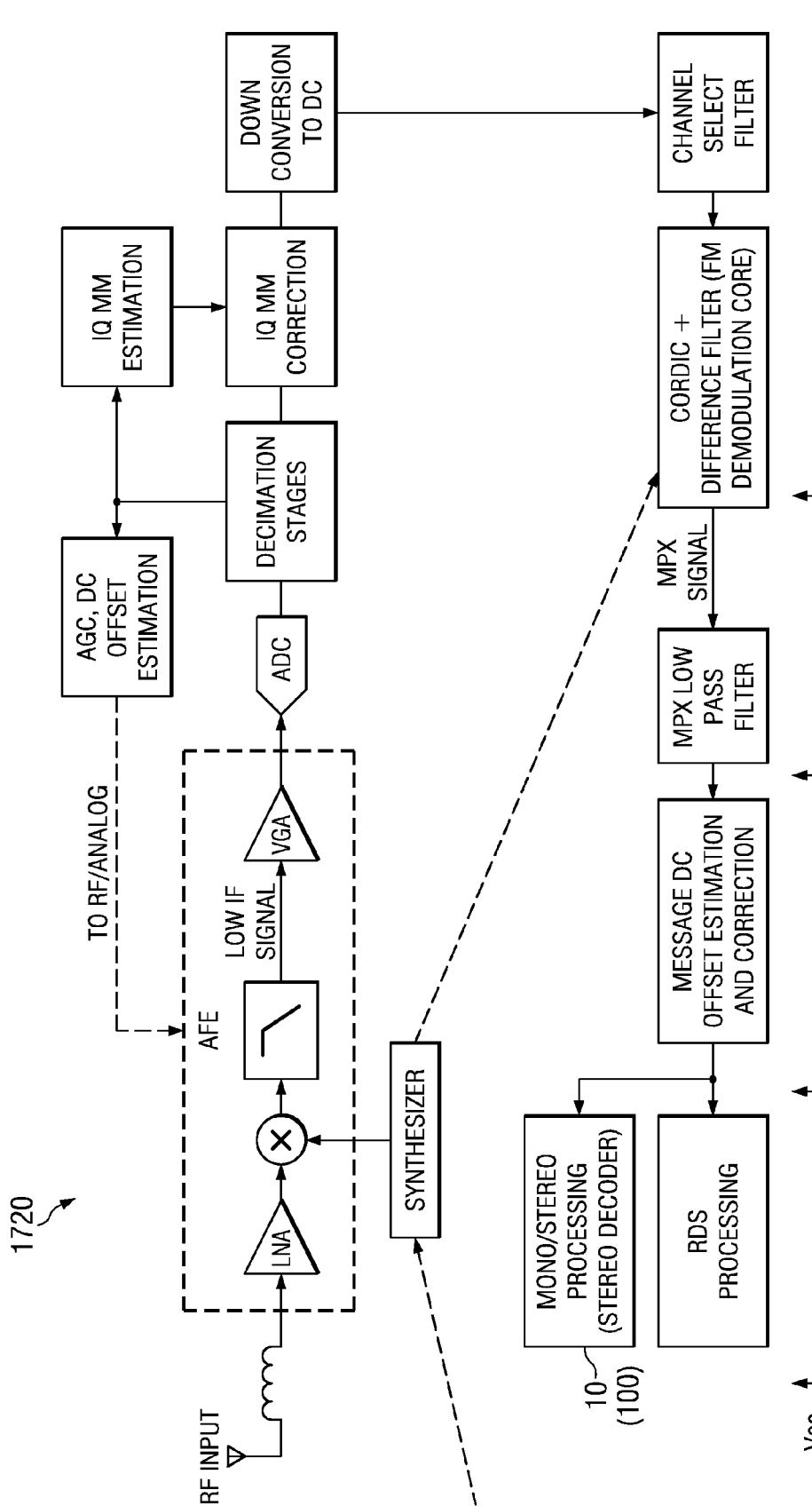
FIG. 10 is a block/flow diagram of an FM receiver specially improved for increased resistance to coexistence interference is shown in the other Figures.
Figure 11:
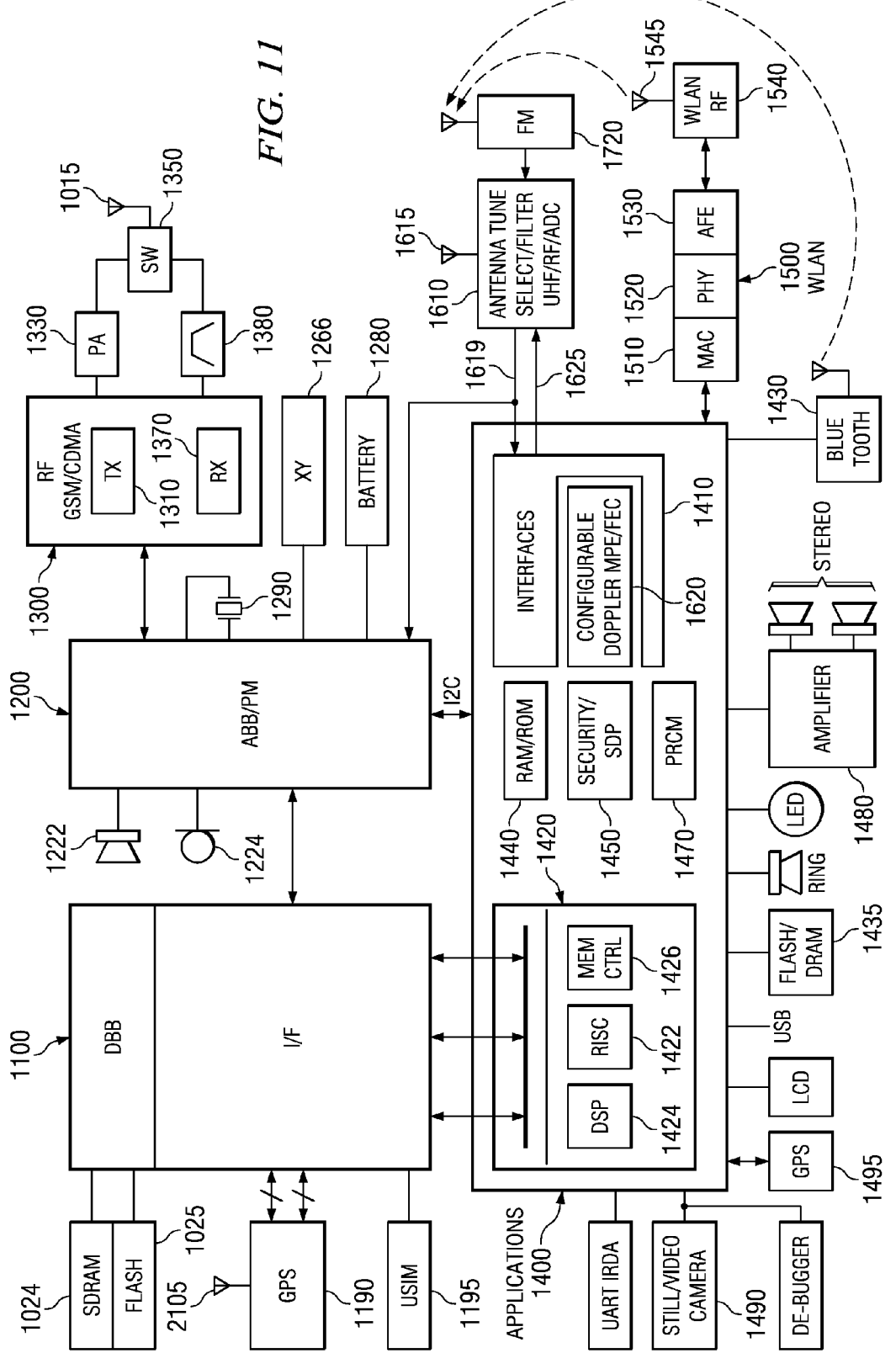
FIG. 11 is a block diagram of a system on chip integrated circuit (SOC IC) embodiment having coexisting radios with processors and storage for instructions instantiating one form of the embodiment of FIG. 3 or FIG. 5.

In FIG. 1, problematic audible clicks can arise in an FM receiver combined, e.g., with Bluetooth (BT) and/or WLAN (wireless local area network) in a device or a system on a chip (SOC) as in FIG. 11. An example block diagram for such an FM receiver is described in FIG. 10 later hereinbelow. For some background on some FM receiver technology, see U.S. Pat. No. 7,797,630 "FM Stereo Decoder Incorporating Costas Loop Pilot to Stereo Component Phase Correction" dated Aug. 31, 2010 (TI-61317), which is hereby incorporated herein by reference in its entirety.

In FIG. 1, these audible clicks can result, or appear to result, from events such as BT or WLAN start/stop operations (pulses in FIG. 1) causing temperature changes on chip, and consequent FM synthesizer drifts in frequency on the order of about 1 KHz (1000 Hz). (In FM in general, a change in signal frequency is demodulated into a change in output voltage, so a change in synthesizer frequency causes a change in the down-converted signal frequency that is FM demodulated.) See also FIGS. 10 and 11 for a depiction of possible paths of interference between coexisting radios, such as power supply lines Vcc and common as well as possible unintended thermal and wireless couplings represented by dotted lines.

On FM demodulation, these interferences can appear as low-frequency audio artifacts. The exact nature of these artifacts would depend on the specific implementation of the FM demodulation system. For example, in the case of thermal coupling, this interference appears in FIG. 1 as a drift in the envelope of the audio, and FM synthesizer loop corrections at an FM synthesizer loop update rate (on the order of tens of milliseconds) are audible as clicks.

In FIG. 1, these clicks are detailed in a magnified portion of the waveform diagram (at right). (For example, the waveform can be observed anywhere on either left L or right R channel in FIG. 2 or at Mono L+R output of stereo extraction 16 in FIG. 3.) These clicks show up as a sequence of brief spikes decreasing in magnitude, each having a width less than about 10 milliseconds, and repeated about every 62.5 milliseconds.

Without the remarkable circuit combinations and improvements herein, the envelope detector responds to these sequences of decreasing spikes as contributions to the envelope magnitude in FIG. 1. (The envelope waveform of FIG. 1 can be observed at the output of envelope detector 35 in FIG. 2.). As a result, the FIG. 2 envelope detector 35 and the silence detection state machine 45 could supply an output falsely indicating presence of demodulated audio when silence in the true audio signal should have been detected instead and output of the FM demodulator should have been silenced by attenuation factor a. However, the remarkable circuit combinations and improvements herein prevent the output of the FM volume control 25 from being active in this scenario so that the annoying clicks are prevented from reaching an audio transducer and listening user.

BT/WLAN packet activity results in phase noise spurs in the receiver synthesizer. On FM demodulation these appear as audio-band spurs and are audible as a buzz/hum content. In FIG. 1, this is seen clearly before the clicks become the dominant artifact.

Some of the embodiments recognize and solve a problem wherein synthesizer pulling can cause conventional demodulator circuitry to undesirably come out of audio silence or data cut-off. This problem is solved herein by various embodiments so that interfering audio hum and clicks are rejected, and/or erroneous data is rejected.

Figure 2:
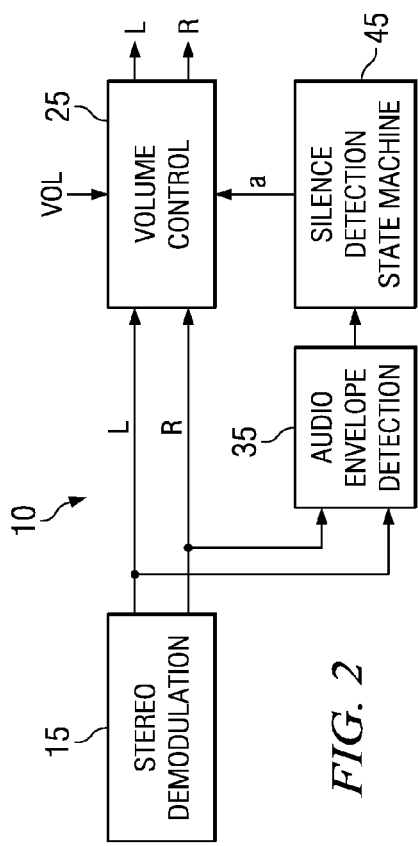
FIG. 2 is a block diagram of a stereo decoder including silence detection for an FM receiver.

In FIG. 2, an embodiment 10 for Silence Based Attenuation herein under idle channel (no-audio) conditions performs audio envelope measurements and monitors the audio envelope for silence periods and attenuates the audio signal. Stereo demodulator 15 feeds left and right channel audio to a volume control circuit 25 that is also adjustable by an attenuation factor. An audio envelope detection block 35 provides an output that follows the audio envelope, and that output is provided to a silence detection state machine 45. (A remarkable pre-high pass filtered audio envelope detection structure and process, introduced in FIG. 3 wherein the high-pass filtering is happening up-front, prior to envelope detection, is responsive to the left and right channels from the stereo demodulator 15 to deliver a dramatically improved envelope detection output.) The silence detection state machine 45 provides an attenuation factor a to the volume control circuit in a controlled response to the envelope detection output. Silence detection state machine 45 also provides suitable hysteresis that provides, e.g., an attenuation when the audio envelope reaches a low level threshold and does not release the attenuation until the audio envelope reaches a higher level threshold, so as to prevent frequent toggles in the attenuation value.

Figure 3:
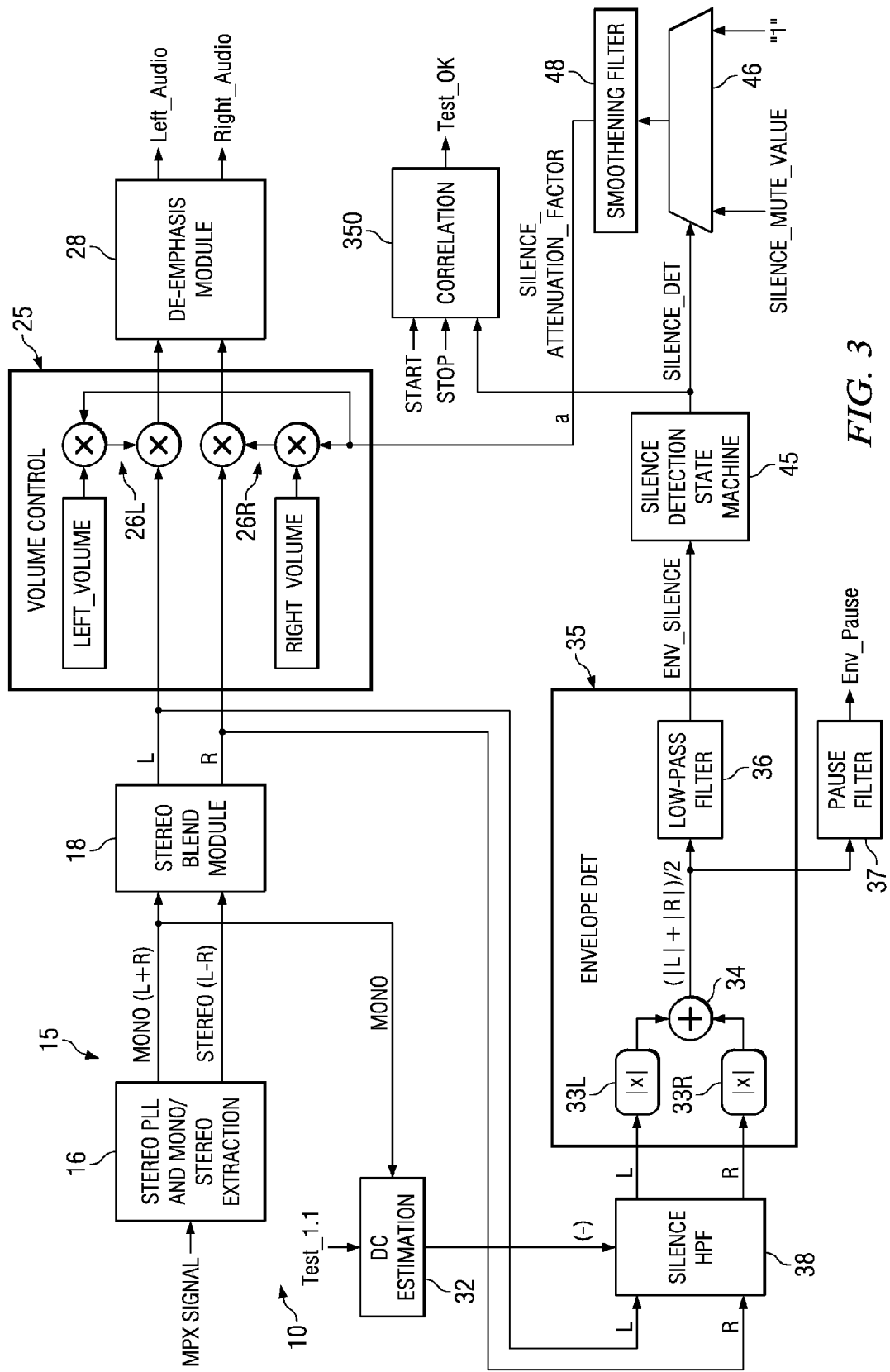
FIG. 3 is a block/flow diagram detailing a stereo decoder embodiment that substantially resists coexistence interference.

The envelope detector 35 in FIG. 2 is dramatically improved in FIG. 3 to detect, account for and remedy the slow build-up in the audio envelope resulting from the clicks in FIG. 1. One or more different kinds of envelope-based silence/pause detection processes that might conventionally be used for silence assessment in FIG. 2 can be dramatically improved for providing embodiments in FIG. 3. The envelope detection process for detector 35 is adapted to employ block 38 cooperatively with detector 35 to confer immunity to low frequency glitches.

Figure 2A:
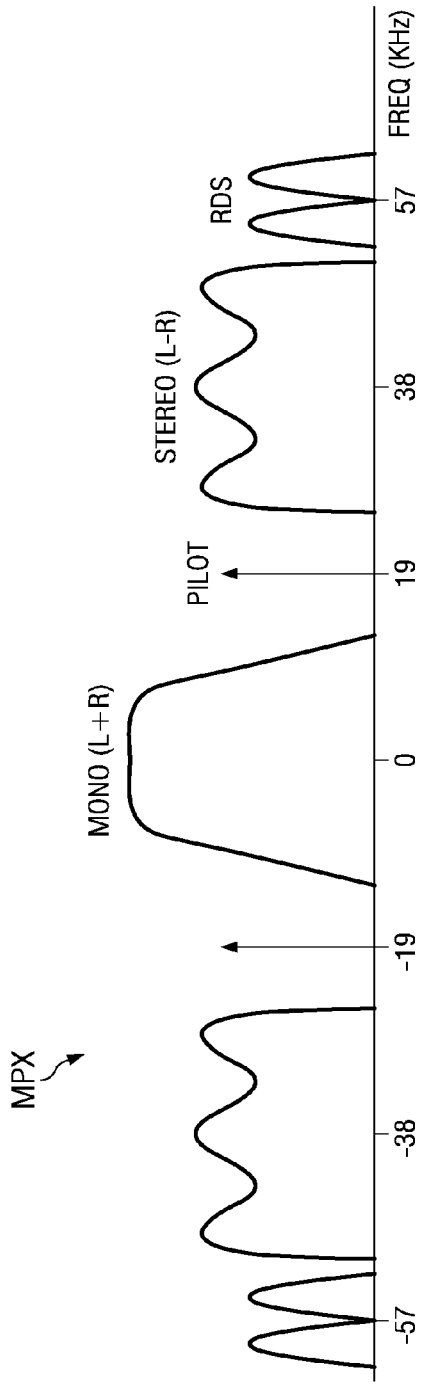
FIG. 2A is an amplitude-versus-frequency spectrum diagram of a multiplex (MPX) signal that is obtained after FM demodulation of an FM broadcast signal, the MPX signal shown over a range of about 50 KHz.

In FIG. 2A, FM broadcast stations each use a 200 KHz bandwidth centered around a center position (0) at their respective FM station frequency $f_s$ in the familiar FM frequency band 88-108 MHz. The FM carrier at frequency $f_s$ is frequency modulated by a MPX (multiplex) signal as illustrated to generate the transmitted FM broadcast signal. The multiplex signal MPX carries stereo left L and right R audio signals for ultimate listening, but in a combined form. The MPX signal has a monaural (mono) sum signal (L+R) component, a pilot signal at 19 KHz, a stereo difference signal component (L−R) centered at twice the pilot frequency, and an RDS (radio data system) signal centered at triple the pilot frequency. The pilot signal is doubled and tripled inside the receiver to separately heterodyne (down-convert) stereo difference signal L−R to the audible range and to down-convert RDS to receive its demodulated data as well. The audio sum and difference signals and the RDS signal can have different frequency deviations in the signal MPX, meaning the amount of frequency variation that a given intensity or loudness of a modulating signal causes. The signal MPX is frequency modulated (FM) onto an RF carrier, and the frequency $f_s$ of the RF carrier determines the location of the FM signal in the FM radio band. At a given such location, FIG. 2A shows the general pattern of frequency components above and below the carrier frequency that pertain to the monaural sum signal L+R, stereo difference signal L−R, pilot, and RDS modulations of the carrier (0). The Stereo Demodulation 15 separates the left (L) and right (R) channel signals by respectively summing and differencing the mono signal with the stereo difference signal so that L=[(L+R)+(L−R)]/2 and R=[(L+R)−(L−R)]/2. Also, an FM receiver can use a radio data system (RDS) circuit or a radio broadcast data system (RBDS) circuit for processing specific data, e.g., station identification, song title, time, program identification, and name of artists, received from an FM broadcast station.

In FIG. 3, a circuit detail of the stereo decoder embodiment 10 of FIG. 2 depicts stereo demodulator 15 having a stereo PLL and mono/stereo extraction circuit 16 followed by a stereo blend module 18. Circuit 16 demodulates the mono stereo sum (L+R) and the stereo difference (L−R) from signal MPX of FIG. 2A. Stereo blend module 18 separates the left (L) and right (R) channel signals by respectively summing and differencing the mono signal with the stereo difference signal as discussed hereinabove. In a more elaborate version, stereo blend module 18 introduces at least one factor K ahead (e.g. on L−R signal) of the sum/difference. The factor cancels imbalance to ensure balance of the actual signals representing the mono stereo sum (L+R) and the stereo difference (L−R). In this way, stereo blend module 18 delivers fully-separated left and right channels L, R as its output.

In FIG. 3, stereo decoder embodiment 10 of FIG. 2 includes a sub-combination embodiment for silence based attenuation inside the Stereo Decoder 10. In FIG. 3, a DC estimation circuit 32 and one or more high pass filters HPFs 38 are introduced in the signal path (or paths such as L and R) before an enhanced dual-channel envelope detection circuit 35 of a silence detector or data cut-off detector. The DC estimation circuit 32 and dual-channel high pass filtering 38 make an important contribution by making the envelope detector 35 immune or substantially resistant to low frequency disturbances, without impacting audio quality in the audio data path and instead enhancing that audio quality by suitable silence detection and volume control. For providing low-complexity circuitry, DC estimation circuit 32 takes the DC average of the mono (L+R) demodulated FM signal. DC removal (−) itself is done by separate or individual subtractors in circuit block 38 that subtract the DC average determined by circuit 32 from channels L and R ahead of the high pass filtering in circuit block 38. In the envelope detector 35, input magnitude circuits 33L, 33R deliver the respective absolute values |L|, |R| or signal magnitudes of each HPF 38 channel to a summer 34. Summer 34 delivers the arithmetic average magnitude (|L|+|R|/2) of the left and right HPF 38 channels. A low pass filter 36 in envelope detector 35 then smoothes or time-window-averages the HPF 38 channel-average magnitude (|L|+|R|/2), and the low pass filter 36 provides the output ENV_SILENCE to the silence detection state machine 45, which is detailed in FIG. 9 and described later hereinbelow. Notice that the envelope detector 35 monitors the sum of magnitudes of the left and right channels |L|+|R| and avoids corner cases at the LPF 36 such as times t when L(t) might approximate minus R(t) if only monaural channel sum L+R energy were applied to LPF 36.

Envelope detection LPF in block 35 in some embodiments is applied on the arithmetic average of left and right magnitudes (|L|+|R|)/2 instead of envelope of mono L+R. Independent low pass filters with different parameters for silence LPF 36 and for pause LPF 37 are suitably fed from the (|L|+|R|)/2 summer 34 in FIG. 3 block 35 to effectively and inexpensively provide envelope detector output ENV_SILENCE for improved silence detection and a separate pause detection output ENV_PAUSE to deliver suitable pause detection respectively. The envelope detector for silence is thus recognized to call for a different range of time constants than a conventional pause detector. The low pass filtering on the average of magnitudes can provide good resistance to spikes or outlier values while tracking the envelope well. The LPF filter suitably rolls off somewhere in a range 10 Hz to 100 Hz (or uses a window in range 10 ms to 100 ms) or other desired range. Various alternative envelope detectors can be suitable as well.

Some embodiments may also substitute separate DC estimation circuits 32L and 32R for the single DC estimation circuit 32 and feed such DC estimation circuits 32L and 32R with the respective left and right channel lines L, R as inputs. As enumerated in TABLE 1, separate HPFs 38.4L and 38.4R in Silence HPF block 38 of FIG. 3 are responsive to the one or more DC estimation circuits 32 by including respective subtractors to remove the DC component from each channel L,R the input to each high pass filter for each channel L,R.

Further in FIG. 3, volume control circuit 25 has channel specific multipliers 26L and 26R provided with Left Volume and Right Volume multiplication factors based on user-based volume and balance controls. These multiplication factors are each multiplied by the Silence Attenuation Factor a provided from the special silencing circuitry and respectively applied to control the volume levels in the stereo channels. The silencing circuitry includes circuits 32, 38, 35, 45 as already discussed. Silence detection state machine 45 responds to the signal ENV_SILENCE from envelope detector 35, and state machine 45 in turn outputs a control signal SILENCE_DET to the selector input of a multiplexer 46. When control signal SILENCE_DET is active, the multiplexer 46 passes an attenuation value Silence_Mute_Value to a smoothing filter 48, and otherwise multiplexer 46 supplies a unity gain value "1" thereto. Smoothing filter 48 outputs the attenuation factor a as a somewhat-smoothed function of time to avoid unduly-abrupt changes between the unity gain value "1" and the Silence_Mute_Value. Smoothing filter 48 thus substantially prevents introduction of undesirable audible artifacts into the volume control 25 due to the operation of the silence detector circuitry itself, while permitting the introduction of desirable attenuation into volume control 25 in response to the silence detector circuitry 32, 35, 45.

In FIG. 3, state machine 45 thus performs silence detection on the envelope detector 35 output and then circuits 46, 48 apply attenuation factor a to the volume control block 25 of the FM receiver. In turn the output of the volume control block 25 goes to one or more de-emphasis stages 28, so that pre-emphasized modulation received from an FM transmitter is electronically de-emphasized (equalized in frequency spectrum) to deliver an excellent replica of original audio that was electronically pre-emphasized prior to FM transmission. Volume control circuit 25 of stereo decoder 10 provides its channel specific outputs to de-emphasis module 28 which in turn delivers channel specific outputs Left_Audio and Right_Audio. The de-emphasis module 28 is an audio filter that compensates for pre-emphasis (high frequencies enhancement) that is applied at the FM broadcasting transmitter. The outputs Left_Audio and Right_Audio may be further distributed and Fade-controlled by user for use with front and rear pairs of stereo loudspeakers or other transducers.

A variety of embodiments can apply the teachings herein to various kinds of frequency modulated receivers, phase modulated receivers, and other receivers to which the teachings herein suitably confer benefits. For one example, wireless receivers can be subject to coexistence scenarios that can introduce interference by way of actuating synthesizer loop corrections. Indeed, interference to the synthesizer is one possibility, and low frequency artifacts or low frequency interference modalities in general are here prevented or substantially attenuated by introducing a circuit like blocks 32, 38 ahead of the envelope detector, which itself is remarkably improved with (|L|+|R|) circuitry 33L/R, 34 herein. The interference may be audible interference to a monaural (mono) audio channel, or to either or both of two multiplexed stereo channels as detailed by way of example at some length herein, or other type of audio channel(s). Alternatively or additionally in some other embodiments, the interference may introduce bit errors into the RDS circuit or into one or more data channels in a receiver of a phase shift keyed (PSK, QPSK, etc) or frequency shift keyed (forms of FSK) data telecommunications system. Also, various kinds of on-chip or off-chip cross couplings may actuate synthesizer loop corrections due to interfering signals from a nearby non-wireless source or from any nearby wireless source such as FIG. 11 BT, WLAN, WiMax, cell phone RF amplifier, or other transmitter. Accordingly, the teachings herein also introduce various combinations of a demodulator, high pass filter circuit, and signal-absence/signal-cutoff detector using any one or more of envelope detection, averaging, windowing, or the like in various kinds of wireless receivers.

The description continues hereinbelow, without limitation, by detailing how the teachings are applied to the specific case of an FM stereo receiver as in FIG. 10 in a multi-radio system-on-chip integrated circuit such as that of FIG. 11.

Figure 4:
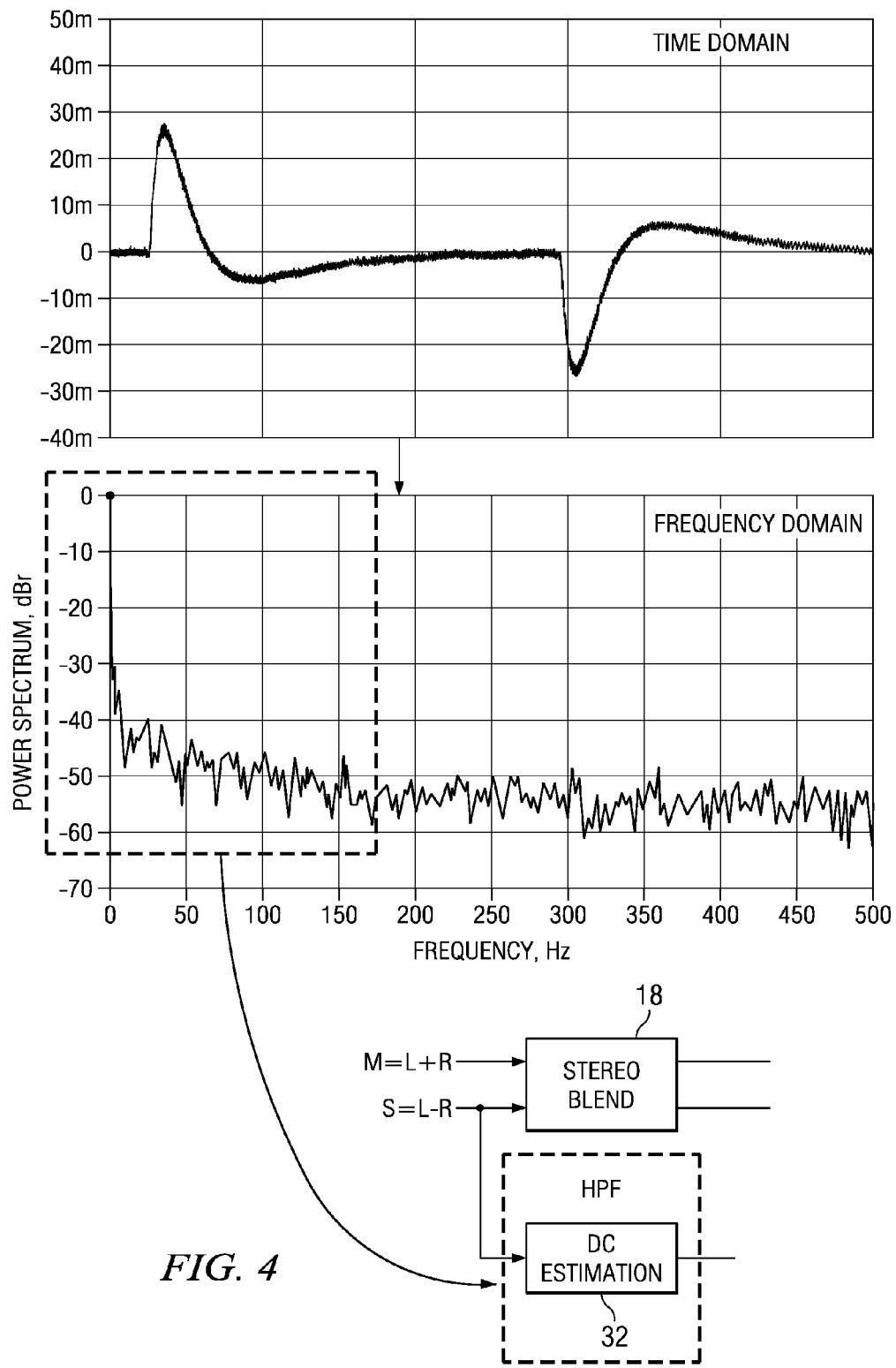
FIG. 4 is a composite of a voltage-versus-time diagram of click-related audio envelope pulses, an amplitude-versus-frequency spectrum diagram at low audio frequencies over a range of about 100 Hz of the audio envelope pulses, and a cutaway block diagram of a high pass filter to remedy the audio envelope pulses.

A variety of particular design implementations may be used to establish the embodiments. In one example for FIG. 3, implementation is fully digital, and the filters for HPF 38 and LPFs 36, 37 are digital filters. For DC Estimation circuit 32 and DC offset compensation in part of HPF block 38, TABLE 1 shows an example of a digital implementation. Block averaging of the digitized mono signal at e.g. 192 kHz suitably averages any desired number (e.g., 64, 128, 256 or other suitable number) of points or decimated points. In the embodiments, the block averaging window for DC Estimation 32 is likely to fall in a range 1 ms to 1000 ms depending on the degree to which it is desired for the DC estimation to track the co-existence Start/Stop pulses in mono envelope graphed in FIG. 4 or to more slowly track the gross disturbance to the DC level of the mono envelope. Some trading off can be expected between the filter characteristic provided for HPF 38 and the canceling at DC and partial canceling at low frequencies that depends on the effective signal time width of the block averaging window of DC Estimation 32. In FIG. 4, the contribution of DC Estimation 32 to the overall high pass filtering in FIG. 3 is symbolized by the partial dotted line 'HPF.' Filtering block 38 also provides digital FIR (finite impulse response) or IIR (infinite impulse response) in various digital filtering embodiments.

In TABLE 1, the legends m.n represent m bits left of a binary point and n bits right of the binary point, and letters signify signed (s) and unsigned (u) digital representations in the electronic circuitry. Signal coupling is from each row to the next row of TABLE 1 unless otherwise indicated. Inputs and outputs of blocks 32 and 38 are indicated all-capitalized.

TABLE 1

DC ESTIMATION AND DC OFFSET COMPENSATION

| Block | Operation | Bits | Coupling |
|---|---|---|---|
| 16 (L + R) Extract'n | INPUT to 32.1 | 1.15s | 192 kHz |
| 32.1 DC Est. | Block average 9.15s 64, 128, 256 | 1.15s (rounded) | |
| 32.2 | Align, 5 more bits | 1.20s | |
| 32.3 | Summer (+) from 32.2, (−) from 32.7 | 2.20s out | |
| 32.4 | Multiply by 1-ρ, (0.8u) | 2.28s out | |
| 32.5 | Summer (+) from 32.4, (+) from 32.8 | 3.28s out | |
| 32.6 | Saturate and truncate toward zero | 1.20s | To 32.7 and 32.9 |
| 32.7 | Register $z^{-1}$ | 1.20s | To 32.8 and 32.3 (−) |
| 32.8 | Align by 8 bits | 1.28s | To 32.5 (+) |
| 32.9 | Round | 1.15s | |
| 32.10 | Hold register | 1.15s | |
| 32.11 | Multiplexer | 1.15s else 0 (disable) | |
| 32.12 | Multiplier × stereo DC scale 3.13u | 4.28s | |
| 32.13 | Saturate and Round | 1.13s OUTPUT of DC Estimation 32 | To summer 38.2L (−) and summer 38.2R (−) |
| 18 (Blend) | L INPUT to 38.1L | 1.16s | 48 kHz, to 38.1L |
| 38.1L | Round L | 1.13s | |
| 38.2L | DC offset compensation (L) Summer | 1.13s | (+) from 38.1L, (−) from 32.13 |
| 38.3L | Truncate | 1.13s | DC Offset Compensated to HPF 38.4L |
| 38.4L | High pass filter | HPF 38 OUTPUT L | Envelope detector 35, 33L input, Silence |
| 18 (Blend) | R INPUT to 38.1R | 1.16s | 48 kHz, to 38.1R |
| 38.1R | Round R | 1.13s | |
| 38.2R | DC offset compensation (R) Summer | 1.13s | (+) from 38.1R, (−) from 32.13 |
| 38.3R | Truncate | 1.13s | DC Offset Compensated to HPF 38.4R |
| 38.4R | High pass filter | HPF 38 OUTPUT R | Envelope detector 35, 33R input, Silence |

In FIG. 4, spectral analysis of the FIG. 1 time domain click waveform reveals a low frequency glitch portion in the envelope of demodulated audio in the frequency domain. FIG. 3 is a graph of Power Spectrum (dBr) from 0 down to −70 on the vertical axis versus frequency in Hertz from 0-500 Hz on the horizontal axis. Observational resolution is suitably 2 Hertz. The low frequency glitch is visible in FIG. 3 below about 100 Hertz and prominent below about 50 Hertz, becoming a spike in the frequency domain near or at DC.

Figure 5:
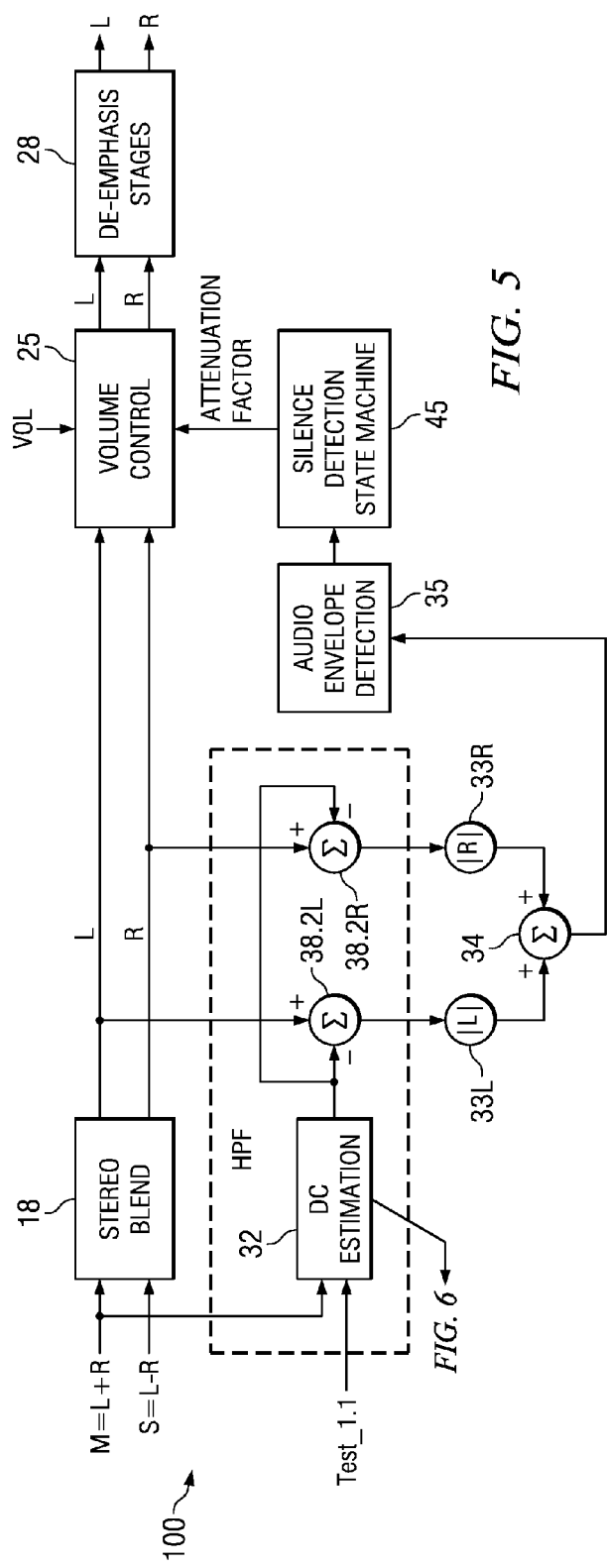
FIG. 5 is a block/flow diagram detailing another stereo decoder embodiment that substantially resists coexistence interference.

In FIGS. 4 and 5, circuitry embodiment 100 provides stereo audio silence detection that is immune or substantially resistant to low frequency glitches. The immunity is achieved by employment of a suitably configured high-pass filter HPF utilizing DC estimation 32 and DC offset compensation summers 38.2L and 38.2R, prior to audio envelope detection LPF in block 35. (Compare with FIG. 3.) This silence detection circuit 100, followed by audio attenuation at volume control 25 via attenuation factor a, can enhance FM receiver user perception under customer-critical co-existence scenarios. The mono M=(L+R) signal prior to stereo blending 18 is used by a circuit combination of DC estimation 32 and DC offset compensation summers 38.2L and 38.2R, for estimation and reduction of DC and low frequency content in the left (L) and right (R) signals, to enable simultaneous high-pass filtering of L and R, without hardware or firmware duplication. In this way, performance and user experience with a single-chip FM+BT+WLAN+GPS transceiver are enhanced.

In FIG. 5, a high-pass filter (HPF) is thus introduced solely by means of DC estimation 32 and DC offset compensation summers 38.2L and 38.2R, and operates on the demodulated Left and Right audio prior to envelope detection. The HPF filters out the FIG. 4 glitch dominated by low-frequency content, prior to envelope detection. In the time domain of FIGS. 1 and 4, this HPF process filters out the drift we have discovered in the DC level of the audio such as due to start/stop of BT/WLAN activity. Such low-frequency disturbances would evidently defeat pause-detection based attenuation even if it were applied in an attempt to improve audio perception in FM, because the detection would detect the disturbances, not a pause. The HPF removes such disturbances prior to audio envelope detection so that silence-detection-based attenuation can be effective against coexistence-related clicks and hum; and pause detection is improved as well.

In FIG. 5, the HPF includes DC estimation circuit 32 responsive to L+R (monaural signal or "mono") and followed by subtractors 38.2L and 38.2R for the respective L and R lines. These subtract the DC estimate from circuit 32 from each of the stereo blend 18 outputs L and R respectively. The resulting DC-compensated L and R signals are then passed through respective absolute value 33L and 33R operations |L| and |R|. As a result of each of the absolute value 33L and 33R operations the sign bit is made only positive. A summer 34 sums |L| and |R| to produce a DC-corrected output that in turn is fed as input to the audio envelope detector module 35.

Further in FIG. 5, and as detailed in the corresponding parts of FIG. 3, envelope detection 35 then deploys a single-pole IIR filter with different "attack" (charge-up) and "release" (charge-down) time constants as parameters for each of Silence detection 36 and Pause detection 37. Silence detection state machine 45 processes the envelope by employing counters to detect silence when the envelope is persistently less than a first predetermined value for at least a first predetermined length of time, and to continue to recognize the envelope as 'silent' unless the envelope persistently exceeds a second predetermined value for a least a second predetermined length of time. Silence detection enhances the quality of the received audio by applying audio attenuation by means of an attenuation factor generated as a control signal by silence detection state machine 45 to volume control 25. Because the HPF filters out a glitch dominated by low-frequency content, prior to envelope detection, the silence detection state machine 45 is not prevented from detecting silence, such as an idle FM channel, when a coexisting radio transmitter might otherwise interfere.

Figure 6:
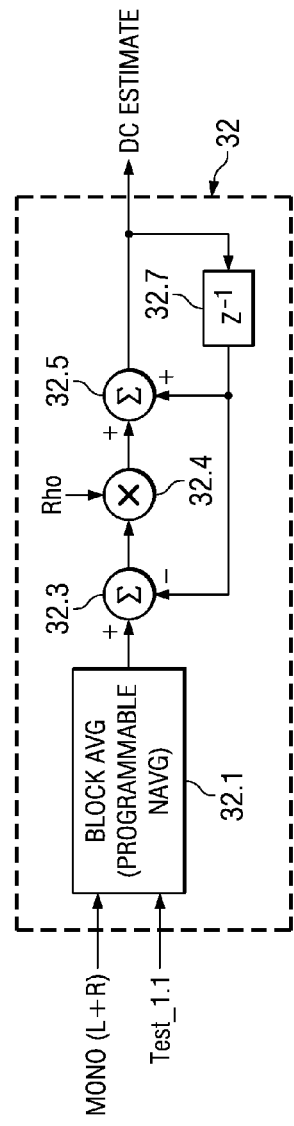
FIG. 6 is a block/flow diagram detailing a DC estimation block for use in the stereo decoder embodiments of FIGS. 3 and 5.

In FIG. 6, the DC estimation 32 of FIG. 5 receives the mono L+R signal. A first part 32.1 block averages L+R over a programmable width $N_{avg}$ of samples, or window. Next, an accumulated value from an accumulation circuit or process formed by summer 32.5 and accumulation register $z^{-1}$ 32.7 is subtracted by means of subtraction 32.3 from the block average 32.1. The difference output from subtraction 32.3 is fed to multiplication 32.4 and multiplied by a loop gain factor ρ (rho). The gain-multiplied difference is accumulated (approximately time-integrated) by the accumulation circuit 32.5, 32.7. The output of the DC detector 32 is the accumulated gain-multiplied difference represented by the operations in FIG. 6 and by Equation (1):

$$Z^t = (1-\rho) Z^{t-1} + \rho \sum_{k=0}^{N_{avg}-1} (L+R)^{t-k}/N_{avg} \quad (1)$$

Roughly speaking, when the block average of instantaneous values of the mono signal is zero, meaning that the DC average is zero, the output of the HPF in FIG. 6 is zero. If the DC average departs from zero, subtraction 32.3 delivers a signed magnitude of the departure. The DC estimation output moves in the direction of the departure. The whole DC estimation 32 operates somewhat like a varying voltage source defined by the windowed mono block average coupled with an RC (resistance-capacitance) circuit. The windowed mono block average 32.1 operates a little like an integrator with a time constant related to the time interval encompassed by the block (e.g., block length 64 divided by clock rate). The 'RC circuit' has a second time constant related to the factor rho ρ divided by register-updating clock rate on $z^{-1}$ 32.7 to provide a smoothly varying DC estimation output that is a low pass filtered mono signal. The subtracters 38.2L and 38.2R subtract this low pass filtered mono signal from the L and R channels, whereby the L and R channels are effectively high pass filtered.

An alternative embodiment might omit block average 32.1 from FIG. 6. Another alternative embodiment might retain block average 32.1 and omit operations 32.3-32.7. It should be evident that yet another embodiment could duplicate the operations of FIG. 6 and respectively drive them with the L and R channels themselves and thereby separately low pass filter (separately DC estimate) the L and R channels. The separate DC estimations would then drive the respective subtractions 38.2L and 38.2R to also provide effective high pass filtering of the L and R channels respectively. Still other alternative embodiments can provide digital operations that directly high pass filter the L and R channels.

Figure 7:
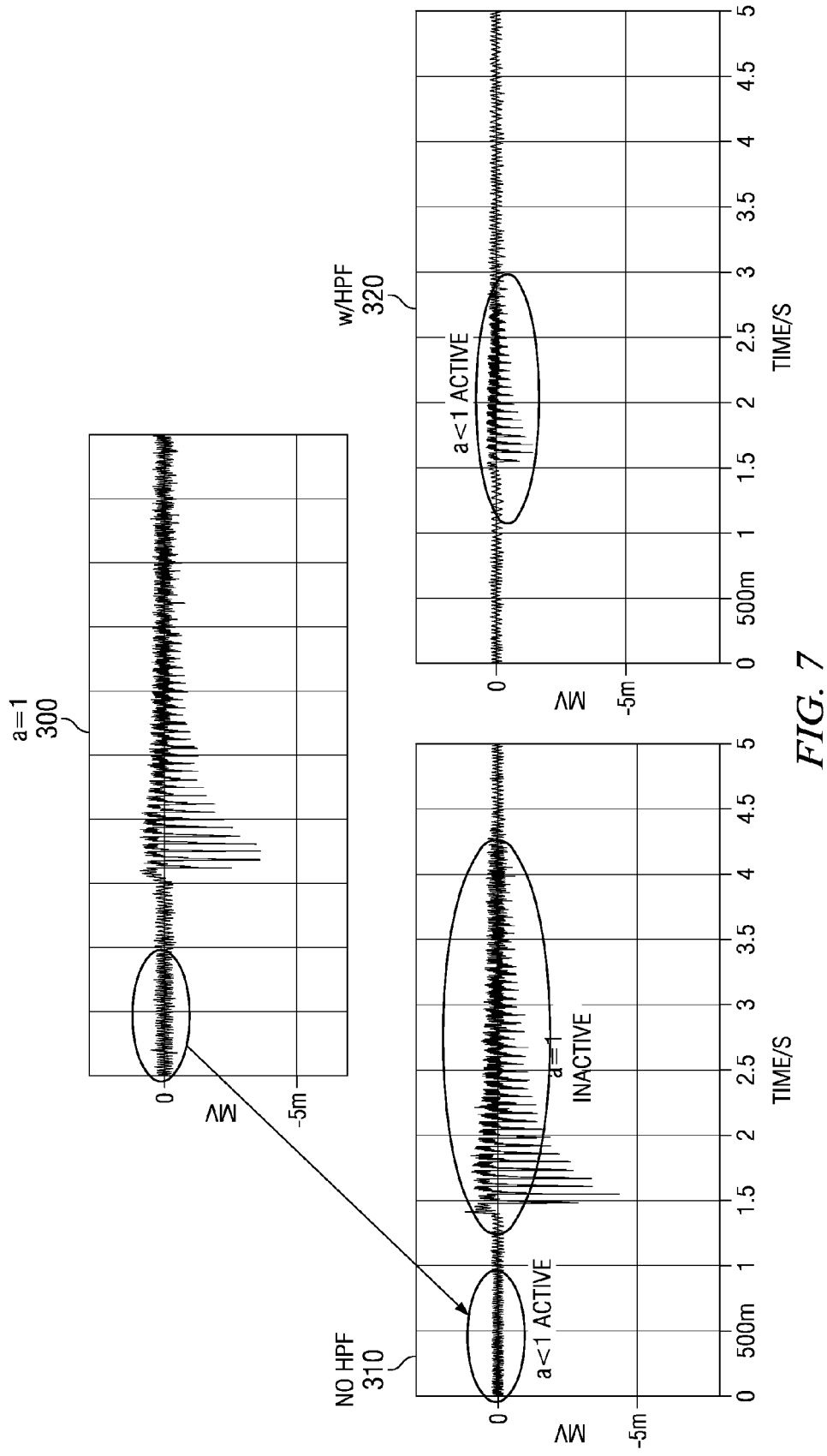
FIG. 7 is a composite of three voltage versus time diagrams of a manufacturing testing process embodiment showing test parts with attenuation control disabled, silence detection subject to coexistence interference, and silence detection made resistant to the coexistence interference.

In FIG. 7, testing suitably captures waveforms at the output of FIGS. 3, 5 volume control 25 and includes user auditory listening tests on a test system having an FM receiver and one or more coexisting radios, such as in a SoC integrated circuit. The testing measures 1) idle FM channel noise level (hum) and 2) level of clicks in idle FM channel during start/stop of WLAN packet activity. FIG. 7 shows waveforms of idle-channel audio artifacts with and without silence based attenuation. A preliminary waveform 300 shows unattenuated (a=1) clicks.

In a first part 1.1 of a Test #1 in waveform 310 of FIG. 7, an HPF 38 of FIG. 3 or DC estimation 32 in FIG. 3 or 5 is disabled by a control signal 'Test_1.1' to reset the DC estimation 32 so that all frequencies pass through HPF unaffected. The attenuation is undesirably inactive (a=1) during clicks in waveform 310 because the extraneous clicks in the system interfere with the silence detection circuitry 35, 45. With the pre-envelope HPF inactivated, the clicks reach envelope detector 35 as if there were signal in the mono L+R channel and disable or de-actuate silence based attenuation a in error (so a=1 Inactive). The silence detection state machine 45 undesirably comes out of its "silence detected" state and fails to attenuate the clicks. Idle channel noise prior to the clicks in waveform 310 is otherwise attenuated (a<1 Active).

In a second part 1.2 of the Test #1 in waveform 320 of FIG. 7, the HPF is then enabled, and the clicks in the actual audio channels L and R are attenuated by volume control 25. Waveform 320 demonstrates the beneficial results of an embodiment wherein the HPF introduced prior to envelope detection 35 resists or impedes the clicks that might otherwise take silence detection state machine 45 of its 'silence detected' state. HPF is now enabled to free up silence detection state machine 45 to introduce silence-based attenuation (a<1 Active) into volume control 25 to attenuate or reject the start/stop clicks. The graph scale on the vertical axis is the same for each part 300, 310, 320 of FIG. 7. Comparison of the attenuated and unattenuated clicks in FIG. 7 indicates a desirable attenuation of about one-quarter (a=0.25), or about −12 dB (=20 log₁₀ a). The value of attenuation is suitably selected for the desired results in a range 0<a<1. Such results from the test #1 on units selected for test as thus performed according to a testing method embodiment herein serve to confirm the efficacy of the entire embodiment including the HPF followed by envelope detection.

The test process illustrated in FIG. 7 is suitably provided as an automated electronic test embodiment that is especially useful in test setups that allow internal visibility to the system or integrated circuit. Control circuitry provides control signals Start and Stop to the coexisting radio(s), and those control signals are automatically electronically compared by the electronic test embodiment with a silence detection control signal such as the output SILENCE_DET from the silence detection state machine 45. In FIG. 3, the automated test process has a circuit 350 that, compares, logical-ANDs, or correlates signals Start and Stop with output SILENCE_DET, and an active output from the comparison, logical-AND or correlation represents a system or SOC IC that passes the test process of Test #1.

Notice that the silence-based detection circuitry 35, 45 is parallel to the audio signal path 16, 18, 25. Consequently, the HPF 34 attenuation (designated g(f) herein, see FIG. 8) in its rejection band is conceptually distinct from and can be desirably selected, configured and established independent of the attenuation factor a. Attenuation factor a is delivered by the silence detection state machine 45 and circuitry 46, 48 to the volume control 25 and displayed in the waveform 320 in FIG. 7.

HPF 34 attenuation g(f) is configured or established in any suitable manner that frees up the silence detection state machine 45 to attenuate the clicks and hum of FIG. 1 and at other times, in the absence of clicks and hum and in the presence of low-pitched pianissimo music or other desired low-volume audio, to pass enough L, R audio to the envelope detection 35 to cause silence detection state machine 45 to de-actuate attenuation, so a=1. In some embodiments judicious configuration of the envelope threshold TH1 (and any other configuration parameters) used in the silence detection state machine 45 and configuration of HPF filter function G(t), from which g(f) arises, is sufficient to either satisfy both criteria (click attenuation and low-frequency pianissimo) or to deliberately give them a relative priority. For one example, the HPF filter function g(f) in the frequency domain is established such that 1/g(f) approximates the frequency domain function observed and plotted in FIG. 4.

A variety of coexistence scenarios and relative signal and interference levels may arise in different systems. Some other embodiments can recognize, in connection with balancing these criteria of click attenuation and low-frequency pianissimo, that desired low-volume low-pitched audio has zero DC content, while clicks are non-zero at DC. Accordingly such embodiments can provide an additional longer-length block average 32.1A (not shown) narrowly targeted to substantially detect non-zero DC content only (f=~0 in FIG. 4), and then prequalify the circuit of FIG. 6 and/or HPF (e.g. 0<=f<50 Hz) generally only if non-zero content is detected at or substantially at DC. In still other embodiments, a prequalifying logic circuit or other intelligent logic may additionally condition operation of the DC estimation 32 with one, some, or all of 1) an FM signal detection ahead of the demodulator such as a Received Signal Strength Indication RSSI> threshold, and/or 2) the pilot lock/unlock signal, or stereo indicator signal, generated in the FM receiver (or a signal derived instead by thresholding the pilot signal in FIG. 2A), and/or 3) Start and Stop control lines from control circuitry that operates the other radios outside the FM receiver.

Figure 8:
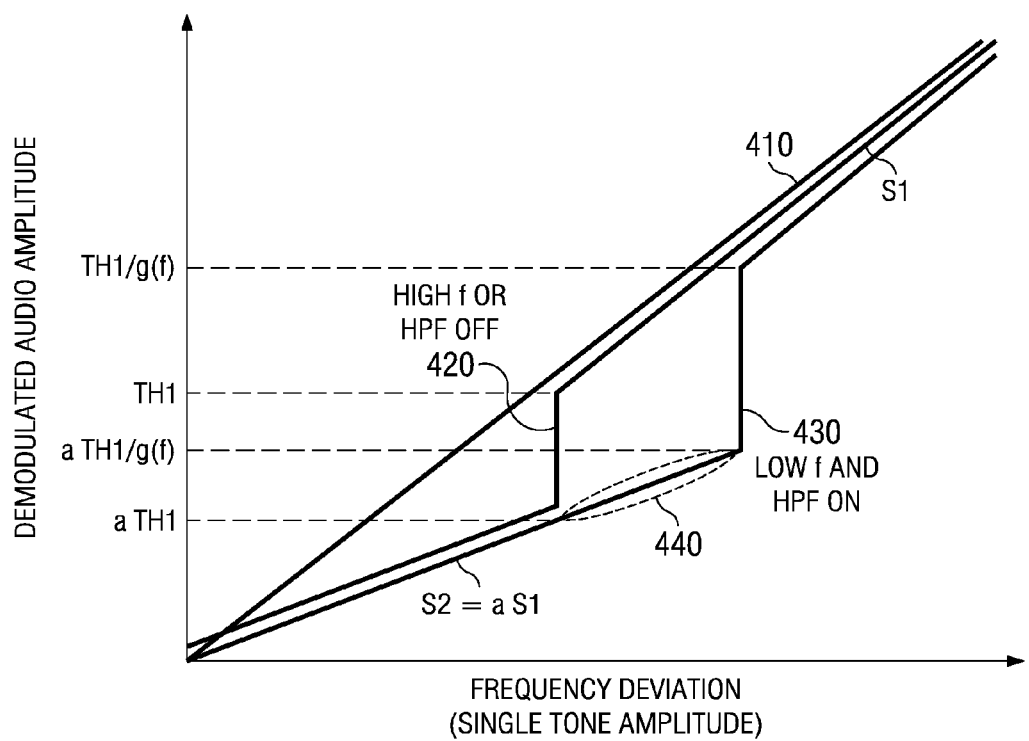
FIG. 8 is a graph of audio envelope voltage of an FM receiver embodiment graphed versus amplitude of a single-tone applied at an FM signal generator coupled to the FM receiver, the graph illustrating various test parts of another manufacturing testing process embodiment.

In FIG. 8, another test process embodiment, designated Test #2, employs an FM signal generator modulated with a variable amplitude single tone and applies the FM signal as a test input to the FM receiver of FIG. 10. Because of the variable amplitude of the single tone modulation, the Test #2 embodiment varies and sweeps the frequency deviation of the single-tone modulated FM signal used as test input. Test #2 then monitors for non-linearity in the demodulated audio amplitude relative to the variation in the amplitude of the single tone modulation at the signal generator (which is proportional to the frequency deviation). This test is useful even in systems or integrated circuits that have little internal visibility because the FM signal generator is operative externally and the demodulated audio amplitude can be relatively easy to acquire from an audio output lead or pin.

For example in FIG. 8, in Test 2 one sweeps the frequency deviation of a single-tone modulated FM signal on a signal generator (e.g., Rohde & Schwarz, Inc.SML03), and automatically plots the demodulated audio amplitude as a function of frequency deviation. According to a first Test Part 2.1, silence-based attenuation is entirely disabled. Then in the absence of the silence-based attenuation a straight line 410 plot results. Straight line 410 has a slope value S1, and ideally passes through the origin (0, 0) of the plot. Then in a second Test Part 2.2, the silence-based attenuation is enabled. If non-linearity 420 is observed instead, then the presence of silence based attenuation is detected, inferred, or confirmed. The attenuation is operative when the audio amplitude is less than a Silence Threshold (e.g., of silence detection state machine 45) corresponding and proportional to the particular frequency deviation value on the horizontal axis at which the nonlinearity 420 occurs. In the presence of silence based attenuation, the plotted line as a whole deviates from being a straight line and instead is piecewise linear with disproportionately lower audio amplitudes at low frequency deviations because of additional attenuation due to the silence-based control thereof. At frequency deviations below and above the nonlinearity 420, the piecewise portions have respective slopes bearing the ratio S2/S1=a, the attenuation fraction. The piecewise portion with slope S1 above nonlinearity 420 essentially coincides with straight line 410. The two piecewise portions are separated by the almost-vertical segment introduced by nonlinearity 420. (Note for clarity of illustration in FIG. 8 that almost-vertical segment is approximately centered on the graph, while in actuality it represents a relatively low amplitude above and near audio noise level. Also, in FIG. 8, the portions with slope S1 of lines 410, 420, 430 will ideally coincide with each other but for illustrative purposes are drawn separate from and very near one another. Similarly, the portions with slope S2 of lines 420 and 430 will ideally coincide with each other but for illustrative purposes are drawn separate from and very near one another.)

A further Test Part 2.3 is provided to detect operation of the HPF 34 or DC estimation 32 prior to audio envelope detection. In other words, Test Part 2.2 detects non-linearity from which operation of the silence-based attenuation is confirmed, and it remains to test for operation of the HPF. To test for HPF, Test Part 2.3 recognizes that Test Part 2.2 in absence of HPF or with HPF off would plot identically for any choice of the modulating tone frequency, high or low because the silence-based detection is envelope based. Moreover, the same plot would occur in Test Part 2.2 even with the HPF on, but with a single-tone audio frequency f sufficiently high to be passed by the HPF. What remains then for Test Part 2.3 is to provide a plot with the HPF on, but with a low single-tone audio frequency that the HPF substantially rejects.

Accordingly, a Version A of Test 2 has the HPF on all the time and simply switches from a high pitch to low pitch of the single tone FM as between Test Parts 2.2 and 2.3. An alternative Version B of Test 2 uses the low pitch of the single tone FM all the time and simply switches the HPF from Off to On to go from Test Part 2.2 to Test Part 2.3.

The conditions that curves 420 and 430 represent are more fully understood by thinking about them conceptually using Boolean logic. Let Boolean variables be H for high frequency and !H (i.e., not-H) for low frequency in a frequency range of rejection by HPF. Another Boolean variable A means HPF active, and !A means HPF inactive. D means silence detector operative, and !D means silence detector not operative. Plotted line 410 in FIG. 8 corresponds to !D. Conceptually, in terms of Boolean logic, line 420 corresponds to TP2.2=D & (H+!A). This means that line 420 is observed when the silence detector is operative and either the frequency is high or the HPF is inactive. Equation (2) expresses an expansion in Boolean logic that represents an equivalent interpretation namely that line 420 is observed with silence detector operative and either of the following: i) high audio frequency and HPF is either active (On) or inactive (Off), or ii) the HPF is inactive (Off) and the audio frequency is either high or low.

$$TP2.2=D\&(H+!A)=D\&[H\&(A+!A)+!A\&(H+!H)] \qquad (2)$$

Then Equation (2) is equivalent to an Equation (2A) since H&!A+!A&H=H&!A=!A&H, meaning either of the following: i) high audio frequency and HPF is either active (On), or ii) the HPF is inactive (Off) and the audio frequency is either high or low.

$$TP2.2=D\&(H+!A)=D\&[(H\&A)+!A\&(H+!H)] \qquad (2A)$$

In FIG. 8, line 430 corresponds to the Boolean logical condition of Equation (3) wherein the silence detector is operative but the conditions for line 420 do not pertain. In words, line 430 is observed when the silence detector is operative and both of the following conditions apply: i) the audio frequency is low (meaning low enough to be rejected by the high pass filter HPF) and ii) the high pass filter HPF is active (On).

$$TP2.3=D\&!(H+!A)=D\&(!H\&A) \qquad (3)$$

The Version A and Version B conditions of Test Part 2.2 vis a vis Test Part 2.3 are summarized in TABLE 2 and represent special cases of Equations (2) and (3). Version A changes the tone frequency from high to low with HPF on (A). Version B changes are HPF from Off to On with the tone frequency low (!H).

TABLE 2

TEST CONDITIONS FOR TEST 2

| Test Part | Test Conditions | Version A | Version B |
|---|---|---|---|
| TP2.1 = | !D | !D | !D |
| TP2.2 = | D & (H + !A) | D & (H & A) | D & (!A & !H) |
| TP2.3 = | D & !(H + !A) | D & (!H & A) | D & (A & !H) |

Accordingly, in Test 2 Version A, Test Part 2.2 and 2.3 provide different modulating tone frequencies as between them. One way to do this is to deliver a high modulating tone frequency (say 100 Hz or 500 Hz) for Test Part 2.2 and plot a line such as 420. Then Test Part 2.3 subsequently reruns Test Part 2.2, in effect, but using a much lower modulating tone frequency, e.g. 5 Hz. The plot should deliver line 430, which is distinct from either line 410 or 420. If a frequency deviation-dependent piecewise output amplitude attenuation is observed, then high-pass filtering HPF can be inferred as present and operating prior to silence detection 35, 45.

Put another way, in Test 2 Version A if an HPF is operating prior to envelope detection, for low modulating tone frequency, an attenuation (low slope S2 relative to slope S1) will be present over a wider range frequency deviation (wider range of e.g. 5 Hz single-tone amplitudes) than is present for e.g. 100 Hz single-tone amplitudes. In terms of Test 2 Version B, if an HPF is operating prior to envelope detection, then for low modulating tone frequency, an attenuation (low slope S2 relative to slope S1) will be present over a wider range frequency deviation (wider range of e.g. 5 Hz single-tone amplitudes) when HPF is turned on than is present if the HPF is absent or Off.

In FIG. 8, testing for operation of an embodiment is performed by simple lab tests, with a controlled FM signal generator input and observing the audio output. Presence of silence based attenuation is confirmed at Test Part 2.2. Normally, a plot of the demodulated audio amplitude as a function of input frequency deviation, yields a straight line 410 at left. Conventional silence based attenuation makes the plot deviate from being a straight line at low frequency deviations because of the additional attenuation where the slope is S2=a S1 in piecewise line 420. Test Part 2.3 indicates operation of the HPF prior to envelope detection 35 for low modulating tone frequencies, according to piecewise line 430 when that line 430 indicates that an additional band of attenuation is found present for demodulated audio amplitudes beyond the silence detection threshold TH1 and up to TH1/g(f) in FIG. 8. Due to the extra band 440 of attenuation a, clicks as strong as TH1/g(f) are remarkably and beneficially attenuated to a level aTH1/g(f) or less in FIG. 8.

Figure 9:
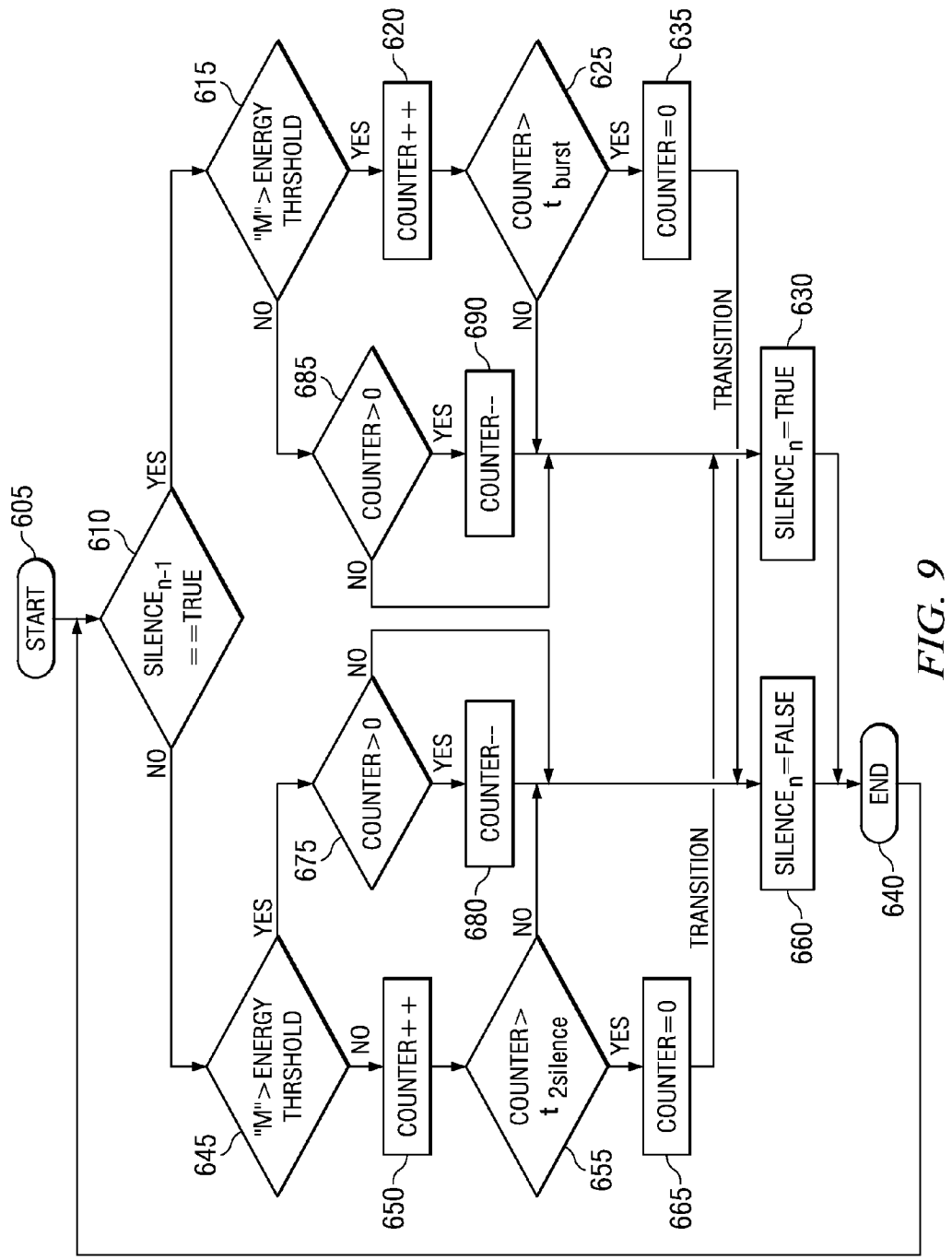
FIG. 9 is a flow diagram detailing a silence detection state machine for use in embodiments of FIG. 3 and FIG. 5.

In FIG. 9, a flow for the state machine 45 has an overall sample-by-sample loop that commences with a START 605 and has a decision based symmetric flow arrangement wherein audio activity is mostly handled on the left half of FIG. 9 and silence is mostly handled on the right half of FIG. 9.

On system reset, state machine state SILENCE is initialized as desired at START 605. (SILENCE is coupled to output line SILENCE_DET in FIG. 3.) Initialization of SILENCE by default to True can attenuate FM audio glitches arising from activity in coexisting radios that may be more likely to be active at such times. Operations proceed on the n-th pass through the loop to a decision step 610 which determines the truth value (logic level) of the next-previous state machine state SILENCE(n−1). If SILENCE=True, then operations proceed to a decision step 615 that determines whether the current envelope value M=ENV_SILENCE from envelope detector 35 exceeds threshold TH1 or a related energy threshold value. If Yes at step 615, and operations go to a step 620 that increments a counter. The state machine 45 counter can count up to e.g. 4 seconds of burst or of silence, which leads to a 18-bit counter ($2^{18}$=256K>48 KHz×4 sec) for counting incoming audio samples at 48 kHz rate.

Configuration registers are loaded beforehand with respective configuration values $\tau_{silence}$ and $\tau_{burst}$ representing respective duration counts that indicate a period of silence or a period of audio activity used to determine whether the state machine 45 state should be changed. For instance, when operations reach a decision step 625, the incremented counter value from step 620 is compared with the configuration value $\tau_{burst}$. If not greater (No) at step 625, then operations proceed to a step 630 that sets the state of SILENCE(n)=True. Along the path 610-625, step 630 effectively maintains the Silence state because not enough sustained envelope activity has occurred to justify changing that state. However, if that decision step 625 determines that the incremented counter value from step 620 is greater than value $\tau_{burst}$, then that amount of sustained envelope activity is recognized as significant, and a branch is made to a step 635 that resets the counter and transitions the state machine to a step 660 and sets the state of SILENCE(n)=False (Audio Active). After either of step 630 or 660, operations proceed to an END step 640. Step 640 determines whether the machine is to be reset. If so operations branch to START 605, but ordinarily no reset is involved, step 640 increments loop index n and the loop goes back to step 610.

Suppose at step 610 that SILENCE(n)=False (Audio Active). Operations branch along the 'No' path from step 610 to a decision step 645. State machine 45 handles audio activity and silence in symmetric ways wherein the path including steps 645-665 mirrors steps 615-635 and increments the counter in case M<TH1 at steps 645, 650. If the count at step 655 exceeds configured value $\tau_{silence}$, then that amount of sustained silence in the envelope is recognized as significant enough to reset the counter at step 665 and transition the output state SILENCE(n) from False (Audio Active) to True (Silence Detected) at step 630. If insufficient sustained silence the step 655, then operations go to step 660 and maintain SILENCE(n)=False.

Next the description returns to step 615 where M<TH1 indicates silence following the Silence Detected state. A pair of steps 685, 690 determines if the counter exceeds zero and, if so, the counter is decremented at step 690. Either way operations reach step 630 and maintain SILENCE(n)=True (Silence Detected). Basically decrementing the counter at step 690 somewhat counteracts incrementing of the counter at step 620, so that if more instances of silence than of audio are occurring then the state machine 45 remains in the Silence Detected state. Even if more instances of audio than of silence are occurring, it will take longer for the counter to change the state to the Audio Active state in case the situation is temporary and the preponderance of instances may resume to favor Silence.

A second pair of steps 675, 680 oriented to continued audio activity mirror the pair of just-described steps 685, 690. There, M>TH1 at step 645 indicates audio following the Audio Active state. Steps 675, 680 determine if the counter exceeds zero and, if so, the counter is decremented at step 680. Either way operations reach step 660 and maintain SILENCE(n)=False (Audio Active). Basically decrementing the counter at step 680 somewhat counteracts incrementing of the counter at step 650, so that if more instances of audio than silence are occurring then the state machine 45 remains in the Audio Active state. Even if more instances of silence than of audio are occurring, it will take longer for the counter to change the state to the Silence Detected state in case the situation is temporary and the preponderance of instances may resume to favor Audio.

Figure 9A:
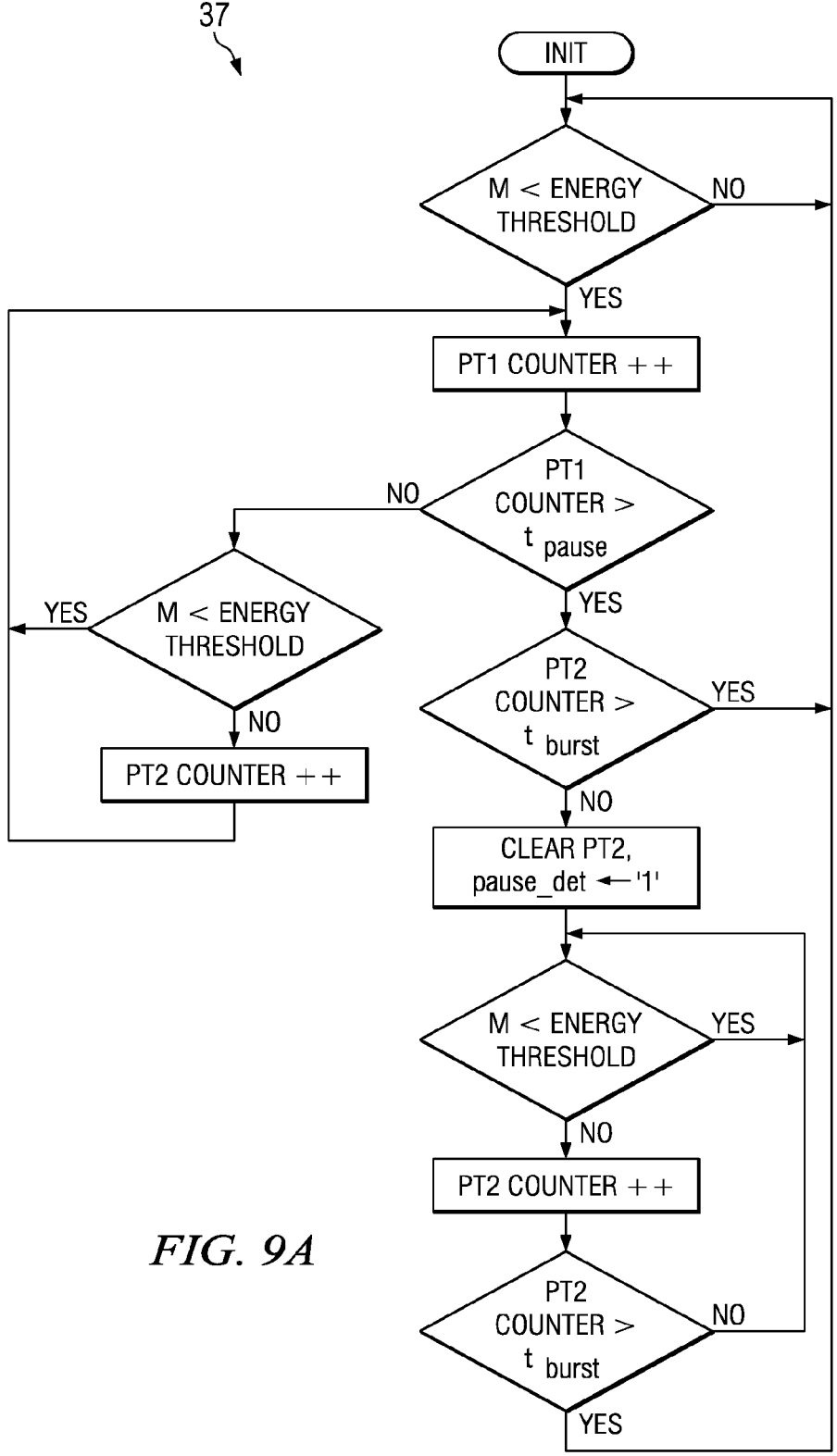
FIG. 9A is a flow diagram detailing a separate pause detection state machine for use in embodiments of FIG. 3 and FIG. 5.

In FIG. 9A, a state machine for pause detection operates as Pause Filter 37 and is provided with an input for the (|L|+|R|)/2 arithmetic average of left and right magnitudes, with the LSB padded to 15 bits unsigned. In the words, the steps wait until the input becomes less than a pause threshold, and then they proceed to increment a pause counter PT1 with each pause value and increment a contra-indicating counter PT2 with each input value that is not less than the pause threshold. The counter PT2 reaches a configured amount, the process is scrubbed and restarted. Otherwise if counter PT1 reaches a sustained pause duration value, then an output state PAUSE_DET is set. Counter PT2 is restarted and the state PAUSE_DET is maintained unless and until counter PT2 reaches its configured amount, whereupon the process is scrubbed and restarted.

In an alternative silence detection state machine 45 or other circuit for embodiments, a lower hysteresis threshold TH2 parameter may additionally be used. In that case, four more levels and lines in FIG. 8 would be entered, related to such lower hysteresis threshold TH2: TH2/g(f), TH2, aTH2/g(f), and aTH2. A pair of hysteresis loops would then be illustrated in place of the vertical line segments of nonlinearities 420, 430. Threshold TH1 represents the threshold of state machine 45 at which the presence of audio is detected if the audio envelope exceeds TH1 in a current 'silence detected' state. Threshold TH2 represents the threshold of state machine 45 at which silence is detected if the audio envelope becomes less than TH2 in a current 'audio detected' state. Threshold TH1 is configured greater than threshold TH2 so that the state machine 45 exhibits some hysteresis that desirably avoids unnecessarily numerous state transitions when the envelope is near one of the threshold values. The counter in FIG. 9 with the configuration values $\tau_{silence}$ and $\tau_{burst}$ also avoids unnecessary state transitions in its own way.

Another type of embodiment can apply separate DC estimations derived from the L channel and R channel respectively to then supply the minus inputs of the subtractors of FIG. 5 for each of the L channel and R channel. Also, some embodiments can separately feed |L| and |R| to respective audio envelope detectors 35L, 35R and separate silence detection state machines 45L and 45R to separate volume control circuits 25L and 25R for the L channel and R channel. While these embodiments are feasible, the audible user experience of separate volume control of the L channel and R channel is perhaps less certain due to an effect on user's spatial experience of stereo sound. Also, the DC components in the L and R channels after blending mathematically add up to be the same as the combined DC component in the L+R mono signal prior to blending, so providing a single DC estimation prior to blending as in FIGS. 3 and 5 appears to be quite effective, accurate and economical. Nevertheless, it cannot be ruled out that in some systems and scenarios, the more complicated types of embodiments described in this paragraph may confer sufficient benefits to also make it desirable to implement them.

A Stereo Indication signal is generated though a configurable LUT (lookup table) circuit addressed with a set of signal lines from respective FM receiver blocks and configuration register bits and acting as an address vector at any given time. The signal lines include PLL Lock onto pilot, PLL Stereo Indicator, (L−R) energy indicator, SNC On, Stereo Override, and Mono Override. However, this type of signal can get unstable at low RF power levels, when a stereo PLL (phase lock loop) toggles between locked and unlocked states. In some of the embodiments, the circuitry to generate this Stereo Indication Interrupt signal also is improved to receives thresholded SQI (signal quality index) based off RSSI with hysteresis, and the Stereo Indication signal is used to qualify operations in some of the embodiments as described elsewhere herein.

In FIG. 10, which shows the larger system of the FM receiver digital base-band, the silence based attenuation mechanism of the other Figures is part of the mono/stereo audio processing unit (stereo decoder). Possible paths of interference between coexisting radios include power supply lines Vcc and common as well as possible unintended thermal and wireless couplings represented by dotted lines.

In FIG. 10, an FM receiver 1720 embodiment includes any of the special stereo decoder embodiments as described elsewhere herein, see e.g. circuit 10 in FIG. 3 or circuit 100 in FIG. 5, etc. In the FM receiver 1720, RF input enters an antenna and goes to an analog front end AFE where it is down converted and ADC (converted from analog to digital form). A frequency synthesizer acts as local oscillator LO for a mixer in the AFE. This frequency synthesizer in some systems can be subject to coexistence interference scenarios (indicated by dotted lines in FIG. 10) that ultimately result in the audible clicks discussed in connection with FIG. 1. Digital signal processing provides automatic gain control, DC offset for the AFE, and phase compensation to correct possible departure of IQ signals from quadrature relationship. Digital down-conversion or de-rotation brings at least one FM channel to baseband, where the signal is passed through a channel select filter. FM demodulation or FM discriminator functionality is performed by a CORDIC and difference filter block, followed by low pass filtering and RDS processing. (CORDIC means COordinate Rotation DIgital Computation and generates values of trig functions without a multiplier and by using only add/subtract, shift and lookup table LUT.) Two blocks, message DC offset estimation and correction and mono/stereo processing (stereo decoder) are improved as shown in the other Figures and further described elsewhere herein.

In FIG. 10, some embodiments provide all the digital blocks by an electronic circuit for the FM receiver that has an electronic processor of modulated FM at baseband and also to demodulated and process demodulated FM audio. An electronic instruction storage is coupled with the electronic processor so that the electronic processor operates in accordance with the instructions therein. At least a portion of storage represents stereo demodulation and volume control thereof, high pass filtering of the stereo demodulation and audio envelope generation preceded by the high pass filtering, with the volume control responsive to the audio envelope generation. Each of FIGS. 3 and 5 also represents such stored blocks of instructions for such embodiments.

In FIG. 11, a system context suitably includes the FM receiver of FIG. 10 and coexisting radios such as BT/WLAN, and is depicted by way of example and not of limitation. It is contemplated that the skilled worker uses each of the integrated circuits shown in FIG. 11, or such selection from the complement of blocks therein provided into appropriate other integrated circuit modules, or provided into one single integrated circuit module, in a manner optimally combined or partitioned between the modules, to the extent needed by any of the combo SOCs, cellular telephones, radios and televisions, Internet audio/video content players, fixed and portable entertainment units, WLAN gateways, routers, pagers, personal digital assistants (PDA), organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages. For some background on system on chip technologies, see U.S. Patent Application Publication 20080307240 (TI-60478) "Power Management Electronic Circuits, Systems, and Methods and Processes of Manufacture," which is incorporated herein by reference in its entirety.

In FIG. 11, a cell phone modem 1100, 1200, 1300 is suitably interfaced with an applications processor 1400 and various radios for WLAN 1500, Bluetooth 1430, GPS 1495, FM 1720, and others. Applications processor 1400, for example, can include a processor block 1420 having RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller 1426 with DMA (direct memory access), and a graphic accelerator for a 2D or 3D (two/three-dimensional display) 1266. The RISC processor 1422 and the DSP 1424 suitably have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On-chip RAM/ROM 1440 provides on-chip storage, and interfaces 1410 couple the processors 1422 and 1424 to the off chip peripherals. The applications processor 1400 also includes a security/SDP (secure distributed processor) block 1450. A USIM (universal subscriber identification module) 1195 is coupled with an interface portion of DBB/IF 1200.

In FIG. 11, circuitry for digital baseband DBB/IF 1100, analog baseband/power management ABB/PM 1200, and RF TX/RX 1300 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service HSDPA/HSUPA (High Speed Downlink Packet Access, High Speed Uplink Packet Access) (or 1xEV-DV, 1xEV-DO or 3xEV-DV), via an analog baseband chip and GSM/CDMA transmit/receive chip (in cell modem). SDRAM 1024 and flash memory 1025 suitably provide memory support for DBB/IF 1100. FIG. 19 provides a representative detail of parts of RF TX/RX for any of the wireless modems such as RF TX/RX 1310/1370, WLAN RF 1540, Bluetooth 1430, and others. A switchplexer or circulator 1350 couples RF power amplifier 1330 and RX 1370 with bandpass filter 1360 to a cell phone antenna 1015.

An audio/voice block in ABB/PM 1200 is suitably provided to support audio and voice functions and interfacing. A microphone 1224 and an audio output transducer 1222 are coupled with ABB/PM 1200. Speech/voice codec(s) and speech recognition are suitably provided in memory space in an audio/voice block in ABB/PM 1200 for processing. Applications processor 1400 in some embodiments is coupled to location-determining circuitry for satellite positioning such as GPS (Global Positioning System) 1190 having an antenna (2105) or 1495 and/or to a network-based positioning (triangulation) system, to an accelerometer, to a tilt sensor, and/or other peripherals to support positioning, position-based applications, user real-time kinematics-based applications, and other such applications.

ABB/PM 1200 includes a power conversion block, power save mode control, and oscillator circuitry based on crystal 1290 for clocking the cores. A display 1266 is provided off-chip. Batteries 1280 such as a lithium-ion battery provide power to the system and battery data.

Further in FIG. 11, chip (or core) 1400 interfaces to high-speed WLAN 802.11a/b/g/n (Wi-Fi) MAC (media access controller) 1510, PHY 1520, AFE 1530, WLAN RF 1540 and a WLAN antenna 1545. Other data wireless interfaces are suitably provided for coe-existing IEEE 802.15 (Bluetooth and low and high rate piconet, Zigbee, and personal network communications) wireless circuit. Other interfaces suitably include a MCSI voice interface, a UART interface for controls and data to position unit GPS and otherwise, and a multi-channel buffered serial port (McBSP) for data. FM radio front end 1720 is coupled with a DVB front end 1610, having an antenna 1615, and they are together coupled with ABB/PM mixed signal chip 1200 and/or applications processor 1400 by control line 1625 and input lines 1619. A configurable Doppler MPE/FEC circuit 1620 supports the DVB. Further in peripherals, a MicroWire (u-wire 4 channel serial port), and USB, and a multi-channel buffered serial port (McBSP) to Audio codec, a touch-screen controller, and audio amplifier 1480 to stereo speakers. External audio content and touch screen (in/out) and LCD (liquid crystal display), organic semiconductor display, and DLP™ digital light processor display from Texas Instruments Incorporated, are suitably provided in various embodiments and coupled to interface of core 1400 for fixed, portable, mobile and/or vehicular use. An interface provides EMT9 and Camera interfacing to one or more off-chip still cameras or video cameras 1490, and/or to a CMOS sensor of radiant energy. PRCM 1470 (power, resets and control module) provides power management.

In FIG. 11, in some embodiments, GPS 1495 operates in close coordination with any one, some, or all of WLAN, WiMax, DVB (digital video broadcasting), or other network, to provide positioning, position-based, and user real-time kinematics applications. Still other additional wireless interfaces such as for wideband wireless such as IEEE 802.16 WiMAX mesh networking and other standards are suitably provided and coupled to the applications processor integrated circuit and other processors in the system.

Various production-testable and/or field-testable system embodiments with one or more SOCs are provided on a printed circuit board (PCB), a printed wiring board (PWB), and/or in an integrated circuit on a semiconductor substrate.

Structures and processes described herein confer enhanced idle-channel FM coexistence performance, such as for FM transceiver cores in multi-radio or combo devices. Such enhanced performance enhances the user experience and can benefit a large proportion of users due to the increasingly high penetration of FM into mobile consumer electronics devices.

The circuitry and processes are operable with RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays. The compressed scan chain diagnostic circuitry is useful in other types of integrated circuits such as ASICs (application specific integrated circuits) and gate arrays and to all circuits with structures and analogous problems to which the advantages of the improvements described herein commend their use.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

Aspects (See Notes Paragraph at End of this Aspects Section.)

22A. The stereo audio circuit claimed in claim 17 further comprising a pause detector having parameters independent from said silence detector.

22B. The stereo audio circuit claimed in claim 17A wherein said envelope detector includes a sum-of-magnitudes module responsive to left and right audio outputs, and an averager fed therefrom, said envelope detector and said pause detector both fed from sum-of-magnitudes module.

22B1. The stereo audio circuit claimed in claim 17B wherein said averager includes a low pass filter.

22C. The stereo audio circuit claimed in claim 17 further comprising a smoothing filter coupled between said silence detector and said volume control section, whereby to provide smooth changes of attenuation in response to said silence detector.

22D. The stereo audio circuit claimed in claim 17 wherein said silence detector includes a silence detection state machine.

22E. The stereo audio circuit claimed in claim 17 further comprising de-emphasis module fed by said volume control section, whereby supplying left audio and right audio.

23A. The stereo audio circuit claimed in claim 18 wherein said high pass filter substantially provides at least some low-frequency rejection below approximately 50 Hertz, whereby providing stereo audio silence detection that is more resistant to low frequency glitches.

26A. The stereo audio circuit claimed in claim 21 further comprising a high pass filter that includes a DC estimator responsive to said approximately monaural output from said stereo extractor and coupled with said envelope detector to make the envelope detector substantially resistant to near-DC drifts due to synthesizer pulling, whereby enhancing audio quality at the outputs of the volume control.

26A1. The stereo audio circuit claimed in claim 21A wherein said DC estimator is operable to provide digital filtering including a block average of the approximately monaural output from said stereo extractor.

34A. The process claimed in claim 34 further comprising adjusting the attenuation factor for optimal interference attenuation.

34B. The process claimed in claim 34 further comprising configuring hysteresis thresholds for a silence detection state machine responsive to said envelope detection and for controlling the attenuation.

35A. The process claimed in claim 35 wherein said comparing includes a correlation process.

Notes about Aspects above: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, having, has, with, or variants thereof are used in the detailed description and/or the claims to denote non-exhaustive inclusion in a manner similar to the term comprising. The appended claims and their equivalents are intended to cover any such embodiments, modifications, and embodiments as fall within the scope of the invention.

What is claimed is:

1. An electronic circuit for use in a wireless receiver, the circuit comprising:
   an audio demodulator;
   an audio envelope portion operable to deliver an audio envelope signal;
   a high pass filter coupled between said audio demodulator and said audio envelope portion;
   a volume control fed by said audio demodulator and operable to provide a controllable audio signal output; and
   a controller responsive to said audio envelope portion to provide an attenuation control to said volume control; wherein said audio demodulator includes a stereo demodulator, said high pass filter is coupled to receive a monaural signal input from a portion of said audio demodulator, said high pass filter is fed with audio channels from said stereo demodulator, and said high pass filter is responsive to the monaural signal input to provide a direct current (DC) estimation, and said high pass filter includes a subtractor circuit fed with the audio channels and providing an output with the DC estimation subtracted out, said audio envelope portion responsive to such output.

2. The electronic circuit claimed in claim 1 wherein said high pass filter is operable to substantially prevent direct current (DC) and near-DC variations from reaching said audio envelope portion.

3. The electronic circuit claimed in claim 1 wherein said high pass filter has a pair of audio channel-related outputs, and said electronic circuit further comprises a signal processing portion responsive to said audio channel-related outputs to deliver substantially a sum of channel magnitudes to said audio envelope portion.

4. The electronic circuit claimed in claim 1 wherein said audio envelope portion includes a low pass filter operable upon a magnitude of output from said high pass filter.

5. The electronic circuit claimed in claim 1 wherein said audio demodulator includes demodulated signal outputs, and said high pass filter has a first section responsive to at least one of said demodulated signal outputs to provide a direct current (DC) estimation and deliver an output responsive to at least one of said demodulated signal outputs with the DC estimation subtracted out, and said high pass filter has a second section operable to supply a second output as a function of magnitude of the output of said first section and coupled to provide the second output to said audio envelope portion.

6. The electronic circuit claimed in claim 1 wherein said high pass filter is coupled between said audio demodulator and said audio envelope portion, said controller operable for audio silence detection, whereby the circuit is resistant to low frequency glitches.

7. The electronic circuit claimed in claim 1 wherein said demodulator is operable to provide a data output.

8. The electronic circuit claimed in claim 1 further comprising an electronic processor operable in accordance with instructions at least partially implementing at least one of said demodulator, said audio envelope portion, said high pass filter, said volume control, and said controller.

9. An electronic circuit for use in a frequency modulation (FM) receiver, the circuit comprising:
 an electronic processor configured to process demodulated FM stereo audio signals;
 an analog front end coupled with said electronic processor and operable to down-convert a FM broadcast signal; and
 an electronic instruction storage coupled with said electronic processor so that said electronic processor is operable in accordance with instructions stored on the electronic instruction storage, wherein at least a portion of said storage represents monaural and stereo audio processing, stereo volume control, a high pass filter, an audio envelope generation preceded by the high pass filtering, and selective attenuation control for the volume control responsive to the audio envelope generation, wherein said analog front end has a low-intermediate frequency (IF) output, and at least a portion of said storage also represents instructions for said processor to execute a digital down-conversion from said low-IF output to deliver a multiplex stereo baseband.

10. The electronic circuit claimed in claim 9 operable in an environment of at least one coexisting radio and wherein said analog front end includes a frequency synthesizer subject to coexistence interference, said electronic processor responsive to said electronic instruction storage as aforesaid to substantially attenuate the coexistence interference from the demodulated audio.

11. The electronic circuit claimed in claim 9 wherein said electronic instruction storage includes a representation of a pause detector independent of the selective attenuation control.

12. A mobile device having a frequency modulation (FM) receiver and a least one coexisting radio operable to indirectly introduce low-frequency audio glitches in said FM receiver, said FM receiver including an FM demodulator, a stereo decoder, an audio section fed from the stereo decoder, and a silence-detection-based attenuation control section for said audio section responsive to said stereo decoder and having an anti-glitch section whereby the attenuation control is made resistant to the audio glitches.

13. The mobile device claimed in claim 12 wherein said anti-glitch section and said silence-detection-based attenuation control section are together operable to establish non-linearity in demodulated audio amplitude from the audio section under such attenuation control as a function of amplitude of a single tone modulation.

14. The mobile device claimed in claim 12 wherein said silence-detection-based attenuation control section is operable to establish a non-linearity in demodulated audio amplitude from the audio section under such attenuation control as a function of amplitude of a single tone modulation.

15. The mobile device claimed in claim 14 wherein said anti-glitch section is operable to alter the non-linearity depending on the frequency of the single tone modulation.

16. The mobile device claimed in claim 14 wherein said anti-glitch section is operable to alter the non-linearity depending on the frequency of the single tone modulation particularly over a range from a frequency less than 50 Hertz to a frequency greater than 100 Hertz.

17. A stereo audio circuit comprising:
 a stereo decoder supplying left and right channel audio outputs;
 a volume control section for the right and left channel audio outputs that is adjustable by an attenuation control;
 an audio envelope detector operable to provide an audio envelope output approximately representing an averaged sum of magnitudes of the right and left channel audio outputs; and
 a silence detector responsive to the output from said audio envelope detector and operable to provide the attenuation control.

18. The stereo audio circuit claimed in claim 17 further comprising a high pass filter fed with the right and left channel audio outputs and having a high pass filter output coupled to said audio envelope detector.

19. The stereo audio circuit claimed in claim 18 wherein said high pass filter further has an input for a monaural feed from said stereo decoder.

20. The stereo audio circuit claimed in claim 17 wherein said silence detector is operable to provide the attenuation control with hysteresis based on lower and higher thresholds for the output from said audio envelope detector.

21. The stereo audio circuit claimed in claim 17 wherein said stereo decoder includes a stereo extraction circuit to provide at least approximately a monaural output and at least approximately a stereo difference output, and further includes a stereo blend circuit fed by said stereo extraction circuit to supply the left and right channel audio outputs.

22. The stereo audio circuit claimed in claim 21 further comprising a high pass filter having subtractors with inputs from the left and right channel audio outputs from said stereo blend circuit and including a direct current (DC) estimator responsive to the approximately monaural output from said stereo extraction circuit, and said DC estimator is operable to generate a low pass filtered estimation signal for both the subtractors to subtract the estimation signal from each of the inputs from the left and right channel audio outputs.

23. A wireless integrated circuit comprising:
 a front end module including a synthesizer loop;
 a baseband module with a signal path and fed by said front end module; and
 at least one co-existing wireless source, the signal path of said baseband module subject to possible interference from the coexisting wireless source by way of synthesizer loop corrections in said front end module, said baseband module including a demodulator, and a demodulated signal path and a high pass filter both coupled to said demodulator, and a demodulated-signal detector including envelope detection fed by said high pass filter and operable to selectively introduce attenuation into said demodulated signal path depending on presence or absence of demodulated signal, whereby reducing interference effects from said co-existing wireless source, wherein said demodulator is selected from the group consisting of: 1) frequency modulation demodulator, 2) phase modulation demodulator.

24. The wireless integrated circuit claimed in claim 23 wherein said high pass filter includes low-frequency rejection according to a combination of a direct current (DC) estimation block average and an accumulation from the block average.

25. The wireless integrated circuit claimed in claim 23 for use with audio signals wherein said demodulated-signal detector further includes a thresholding circuit having at least one envelope threshold, and the high pass filter independently has a filter function, whereby the envelope threshold and the filter function balance interference attenuation and low-frequency pianissimo.

26. The wireless integrated circuit claimed in claim 23 wherein the filter function in the frequency domain is established so that its reciprocal approximates a frequency domain function of the interference.

27. The wireless integrated circuit claimed in claim 23 further comprising a prequalifying logic for the high pass filter with at least one such prequalifying logic selected from the group consisting of: 1) a signal strength detection ahead of the demodulator, 2) a stereo indicator signal, and 3) control input from the coexisting wireless source.

\* \* \* \* \*